(12) United States Patent
Ngo et al.

(10) Patent No.: US 11,851,329 B2
(45) Date of Patent: Dec. 26, 2023

(54) METHOD AND SYSTEM FOR REFORMING CO2 RICH NATURAL GASES INTO SYNGAS USING COLD PLASMA DEVICE COUPLED IN SERIES TO A SEPARATE CATALYST REFORMING REACTOR

(71) Applicants: Phuong Thuy Ngo, Ho Chi Minh (VN); Nguyen Phuc Le, Ho Chi Minh (VN); Tri Van Tran, Ho Chi Minh (VN); Thuy Ngoc Luong, Ho Chi Minh (VN)

(72) Inventors: Phuong Thuy Ngo, Ho Chi Minh (VN); Nguyen Phuc Le, Ho Chi Minh (VN); Tri Van Tran, Ho Chi Minh (VN); Thuy Ngoc Luong, Ho Chi Minh (VN)

(73) Assignee: Vietnam Petroleum Institute (VPI), Ha Noi (VN)

( * ) Notice: Subject to any disclaimer, the term of this patent is extended or adjusted under 35 U.S.C. 154(b) by 0 days.

(21) Appl. No.: 18/049,632

(22) Filed: Oct. 26, 2022

(65) Prior Publication Data
US 2023/0264954 A1 Aug. 24, 2023

(51) Int. Cl.
| | | |
|---|---|---|
| *C01B 3/40* | (2006.01) | |
| *B01J 23/02* | (2006.01) | |
| *B01J 35/04* | (2006.01) | |
| *B01J 37/04* | (2006.01) | |
| *B01J 37/03* | (2006.01) | |
| *B01J 37/00* | (2006.01) | |

(Continued)

(52) U.S. Cl.
CPC .............. *C01B 3/40* (2013.01); *B01J 19/088* (2013.01); *B01J 23/02* (2013.01); *B01J 23/755* (2013.01); *B01J 35/04* (2013.01); *B01J 37/009* (2013.01); *B01J 37/0036* (2013.01); *B01J 37/038* (2013.01); *B01J 37/04* (2013.01); *B01J 37/06* (2013.01); *B01J 37/08* (2013.01); *B01J 37/343* (2013.01); *B01J 2219/0875* (2013.01); *B01J 2219/0892* (2013.01); *B01J 2219/0896* (2013.01); *C01B 2203/0238* (2013.01); *C01B 2203/0261* (2013.01); *C01B 2203/1058* (2013.01); *C01B 2203/1082* (2013.01); *C01B 2203/1241* (2013.01)

(58) Field of Classification Search
None
See application file for complete search history.

(56) References Cited

FOREIGN PATENT DOCUMENTS

| CN | 113842935 A | * 12/2021 |
|---|---|---|
| CN | 114751375 A | * 7/2022 |

OTHER PUBLICATIONS

English Translation for Liu et al from FIT, CN 114751375 A (Year: 2022).*

(Continued)

*Primary Examiner* — Colin W. Slifka

(57) ABSTRACT

A method and system for reforming $CO_2$ rich natural gases is disclosed which comprises: a cold plasma unit configured to convert $CO_2$ rich natural gases into a plasma state; and a gas reforming reactor configured to reform said $CO_2$ rich gas mixture at said plasma state into a syngas. The catalytic reforming reactor is separate and different from the DBD cold plasma unit. Means for latent heat of condensation, endothermic/exothermic reactions, and convection currents is used to achieve energy efficiency.

19 Claims, 18 Drawing Sheets

(51) Int. Cl.
*B01J 37/06* (2006.01)
*B01J 37/08* (2006.01)
*B01J 37/34* (2006.01)
*B01J 19/08* (2006.01)
*B01J 23/755* (2006.01)

(56) References Cited

OTHER PUBLICATIONS

English Translation for Shi et al from FIT, CN 113842935 A (Year: 2021).*

* cited by examiner

METHOD AND SYSTEM FOR REFORMING CO2 RICH NATURAL GASES INTO SYNGAS USING COLD PLASMA DEVICE COUPLED IN SERIES TO A SEPARATE CATALYST REFORMING REACTOR

CLAIMS OF PRIORITY

This application claims priority under 35 U.S.C. § 119 of an application No. 1-2022-01113, entitled "Quy trình reforming nguyên liệu hỗn hợ 'p khí giàu CO2 aẻ tạ o ra khí tỏ ng hợ 'p bảng cổng nghệ tich hợ 'p Plasma lạ nh", filed on 23 Feb. 2022 (Feb. 23, 2022) in the Socialist Republic of Vietnam. The patent application identified above is incorporated here by reference in its entirety to provide continuity of disclosure.

FIELD OF THE INVENTION

The present invention relates to plasma catalytic natural gas reforming for syngas production. More particularly, this invention relates to a system and method for cold plasma catalytic natural gas reforming for small scale syngas production.

BACKGROUND OF THE INVENTION $CO_2$-rich gas mixtures usually include natural gases and biogases that essentially contain 60% of methane ($CH_4$) and 40% of carbon dioxide ($CO_2$). In Vietnam, $CO_2$-rich gas mixtures are used to produce methanol and alcohol. This production involves different stages: First, syngas is produced from the $CO_2$-rich gas mixtures; and then syngas is converted into various liquid products for industrial uses. Natural gases and minerals are collected and stored. While large scale production of methanol from natural gases and bituminous coals can reach 1 million to 2 million tons per year, biogases have the potential to provide 10 billion cubic meters ($m^3$) of syngas. However, in countries like Vietnam, the amount of natural gases exploited do not require a large scale syngas production process. Vietnam produces only 20,000 tons of natural gases per year. In addition, the reforming step in the methanol production accounts for 60% of total energy consumption. At this level of production, the investment costs of a large scale syngas production are not feasible. Therefore, there is a need to have a medium to small scale liquid fuel such as methanol system and process.

There exist many attempts and studies aimed to reduce the investment costs in the reforming process. The first method involves proactively changing the balances of reactions toward lowering the activation energy. Another method involves using micro reactor technology to refine the size of the reforming catalysts. Other methods include the reduction of equipment sizes. Yet other methods include using electrical reactors with micro coating of catalysts and the modification of reforming gases to reduce the reaction thermodynamic barrier. Another method uses plasma technology to soften the reaction conditions. Among those methods, the last two seem to provide feasible economic investment and deserve considerations.

Another method is to use plasma technology. Plasma is known as the fourth state of matters. In the plasma state, when heating to a very high temperature, matters are changed to a state different from solid, liquid, and gas. Although not as well-known as other states, plasma states make up of 99% of the universe. Beyond plasma substances exist in nature, plasma state can be artificially formed by ionizing some or all of a gas. Artificial plasma is classified into thermal plasma and cold (non-thermal) plasma. This classification is based on the energy level, temperature, and ion density. In thermal plasma, the gas is completely ionized, and the temperature of the gas reaches the electron temperatures. This is known as plasma in equilibrium. In cold plasma, the components are not in equilibrium. The gas mass is at room temperature while the electron temperature reaches several thousand degree Celsius. The gas is only partially ionized in this case. At the present, cold plasma is widely studied because it is easier to implement in the laboratory scale and in the industrial scale than thermal plasma. Depending on the discharge form, cold plasma can be further divided into dielectric barrier discharge (DBD), gas arc discharge (GAD), glow discharge, corona discharge, microwave discharge, and radio frequency discharge (RFD), etc.

In cold plasma technology, the gas temperature is maintained at the room temperature, while the electrons are excited to 1-10 electron volts (eV). At this energy level, the electron temperature is very high up to several thousand degree Celsius. These high energy electrons are used to activate inert modules such as carbon dioxide ($CO_2$) and methane ($CH_4$). Consequently, a wide range of chemically reactive species including radicals that excite atoms, molecules, and ions. This energy, generated at low temperature, have the potential to initiate different reactions. This advantage can be used to reduce the kinetic barriers in the biogas conversion reactions. Additionally, thermodynamically stable biogas conversion reactions can be achieved which yields intermediate mixture. These intermediate mixtures from such thermodynamically stable reactions can easily be easily used in reforming processes. For $CO_2$ gas, the moving electrons separate the $CO_2$ molecules into carbon monoxide (CO) and oxygen (O) molecules. This is known as the collision, excitation, and dissociation reaction. More particularly, the CO molecules tend to recombine with the $O^-$ ions to form $CO_2$ molecules again. Alternatively, O— ions are in transition between O, $O_2$, and $O_3$ when interacting with other $O^-$, electrons, or $O^{2-}$ ions. For methane ($CH_4$) gas, it is dissociated and converted to radicals such as $CH_3$—, CH, and H. These electron radicals are unstable and tend to recombine to achieve a more stable state. After the formation of a more stable state, the collision with electrons continues, forming other radicals such as $C_2H_5^*$, $C_2H_3^*$. This recombination occurs to form large hydrocarbons such as $C_2H_6$, $C_3H_8$, $C_4H_{10}$, and $H_2$.

When two streams of $CO_2$ and $CH_4$ gases are passed through a cold plasma region, dissociation reactions to form electron radicals and recombination reactions to form long-chain hydrocarbons take place for the $CH_4$ molecules due to its $sp^3$ bonds and tetrahedral structure. However, with the presence of CO and O from the dissociation reactions of $CO_2$, the reaction turns to the formation of some new compounds containing oxidizing hydrocarbons being oxygenated by Oxygenates such as methanol ($CH_3OH$), formaldehyde ($CH_2O$), acetaldehyde ($CH_3CHO$), etc.

Table 1 below summarizes some recent worldwide research results on the reduction of equipment and material costs aiming at increasing the efficiency of material conversion for processes at low temperatures.

TABLE 1

Some Research Results for the Increase in Material Conversion Efficiency in the Reforming Reactions Using Low-Temperature Plasma. [1-40]

| Reactor System | Experiment Conditions | Results |
|---|---|---|
| Steam reforming combined with partial oxidation with Ni, Rh, PtCeO$_2$ catalyst system | T = 500-800° C.; 33-400 L/(g$_{cat}$ · h) | The reaction temperature for CH$_4$ conversion >80% can be reduced to 600° C. Rh/CeO$_2$/monolith catalyst can give high activity and stability (CH$_4$ conversion was greater than 98%) at large WHSV (400 L/g$_{cat}$ · h) |
| Combining the pretreatment of NO$_x$ raw materials with cold plasma for NOx reduction (De-NOx) on V$_2$O$_5$—WO$_3$/TiO$_2$ catalysts. | S/C = 1.2 and O/C = 0.55 | The NO$_x$ plasma pretreatment process increased the NO$_2$ content converted from NO. The pretreatment mixture can achieve 70% conversion in the DeNO$_x$ process on the catalyst at temperatures as low as 100° C. compared to 200° C. in the absence of plasma integration. |
| Combining pretreatment of gaseous materials containing toluene, HCOOH, CO representing the group of volatile organic compounds (VOCs) by plasma of VOCs removal on Ag/ZSM-5 catalyst. | T = 100-250° C.; 25 liters/minute mixture of 82% N$_2$, 13% O$_2$, 5% H$_2$O, 500 ppm NO$_x$, 500 ppm NH$_3$ | The plasma pretreatment process that produces O$_3$ in the intermediate gas mixture, promoting the reaction at lower temperatures and increasing efficiency of VOCs oxidation. |
| Combining pretreatment of gaseous materials containing Toluene, HCOOH, CO representing the group of volatile organic compounds (VOCs) by plasma of VOCs removal on Ag/ZSM-5 catalyst | T = 100-150° C.; 0.4 L/min VOCs/N$_2$, and 0.1 L/min O$_2$, and 0.5-1 g catalyst | The plasma-formed feedstock process produces O$_3$ in the intermediate gas mixture, promoting the reaction at lower temperatures and increasing the efficiency of VOCs oxidation. |
| Direct conversion of biogas into liquid products in a plasma-integrated catalytic reactor (Cu, Au, Pt, Al$_2$O$_3$) | T = 30° C.; 1 atm CH$_4$/CO$_2$ (3/0.5) at 40 mL/min. | Using catalytic reactor combined with plasma technology to soften the reaction conditions. Direct reaction without syngas production step is carried at room temperature and atmospheric pressure. |
| Single stage CH$_4$ or biogas conversion reaction systems by combining catalytic reaction using plasma energy. | Operating temperature from room temperature up to 1000° K. The main raw materials are CH$_4$ or a mixture with CO$_2$ with additional components of O$_2$, H$_2$O. | Material conversion reach 90%; The selectivity of CO and H$_2$ generation is every low, the reaction mainly produces oxygenates or hydrocarbons with long carbon chains. |

In the cases presented above in Table 1, the ability to carry out the reaction at low temperature was achieved by (a) changing the direction of the normal reaction through the addition of other components or (b) upgrading the reactants so that the intermediate mixture entered the reactions. The primary catalysts had a higher activity. This principle can be applied to highly endothermic reforming reactions, e.g., steam or dry reforming. These reactions were carried out at high temperatures greater than 700° C. to effectively produce syngas. In particular, the plasma integration created an intermediate gas mixture by using electrical energy instead of heat. This created high-energy electrons that thermodynamically activate inert molecules. With this, a variety of reactions and chain reactions were engendered. High enthalpy of intermediate gas mixtures and catalytic materials could reduce the temperature and the pressure of the reactions.

For those applications involving biogas/natural gas feedstock reforming reactions with main components containing methane (CH$_4$) as a reducing agent and the remainder with CO$_2$ as a weak oxidizing agent, the plasma application created an intermediate mixture which had a greater enthalpy than the initial mixture of biogas. Among them, intermediates containing oxygenate compounds or hydrocarbons with oxygen were created because the C—O covalent bonds (360 kJ/mol) was less stable than the C—H covalent bonds (414 kJ/mol). This orientation could be accomplished through customizing the plasma generator quantities as well as the adding of compounds that facilitate the formation of oxygenates mentioned above. This mixture was optimized and transferred to a catalytic reforming reaction to produce syngas.

In summary, there are no patents and non-patent literatures mention the reactivating method without breaking catalyst particles. When the FCC catalyst particle size decreases, meaning that it is impossible to reuse in FCC unit without adding the re-granulation step (1).

Therefore, what is needed are a system at small industrial scale and method for reforming of natural gases that are efficient and economically feasible.

What is needed is a system at small and medium industrial scale for producing syngas that requires low temperatures and pressures.

What is needed is a system at small to medium industrial scale and method for reforming $CO_2$ rich natural gas into syngas consisted of hydrogen ($H_2$) and carbon monoxide (CO) that uses low-temperature plasma.

The present invention meet above long-felt needs and market demands.

SUMMARY OF THE INVENTION

The present invention has been made in view of the aforementioned circumstances, and therefore, an object of the present invention is to provide a novel method and a small industrial-scaled natural gas and biogas reforming system designed to obtain syngas containing hydrogen ($H_2$) and carbon monoxide (CO) by lowering the reaction temperatures.

Accordingly, an object of the present invention is to provide a method and a system that includes a cold plasma device with a dielectric barrier discharge (DBD) chamber and a reforming reactor configured to convert a mixture of $CO_2$ rich biogas and/or natural gases into syngas including hydrogen ($H_2$) and carbon monoxide (CO) with high efficiency while bringing the reaction temperatures down to 30° C. to 40° C. and energy costs and increasing the durability of catalysts.

Another object of the present invention is to provide method for reforming reaction that includes preheating the catalysts to the reaction temperature of 30° C. to 40° C., thus reducing energy consumption up to 23% by lowering the electricity consumption per hour in the syngas production process.

Another object of the present invention is to provide a method for reforming $CO_2$-rich natural gas mixture to generate syngas by using cold plasma separately before the reforming reaction; more specifically, the method includes the following steps: (a) preparing reforming catalysts in which: the reforming catalyst is a Nickel (Ni) based catalyst in powder form, where the mass percentage (w %) of Ni metal is 10% by mass, and magnesium (Mg) of 5% by mass, both carried by $Al_2O_3$ carrier, in which: the reforming catalyst has a monolithic or foam structure with the dimension of φ=10-12 mm, L=10-30 mm, and whereby the reforming catalyst is loaded into a second reforming reactor with a bulk length less than 1/10 of the reactor tube length; (b) carrying catalyst reduction reactions by (i) passing a stream of nitrogen ($N_2$) gas with a flow rate between 50 to 100 mL/min through the second reforming reactor continuously until hydrogen ($H_2$) reduction is completed, (ii) increasing the reactor temperature from room temperature to the reduction reaction temperature of 800° C.; and (iii) after the temperature reaches 800° C., passing the hydrogen ($H_2$) gas stream into the second reforming reactor at the flow rate of 60 mL/min to reduce the catalyst for a duration of 1 hour to bring the active phase to the metallic state, end the reduction process, then reducing the temperature of the reforming reactor to 700° C.; (c) feeding the catalyst prepared in step (a) into the second reforming reactor where a mixture of gaseous feedstock including $CH_4$, $CO_2$, and $H_2O$ at a constant volume ratio of $CH_4/CO_2/H_2O$ being 2.5/1/2 respectively; in which, $CH_4$ is turned to plasma in a cold plasma device with 1 to $N_2$ dielectric barrier in an electrical room configuration of $CH_4/N_2$ of 1:1 with plasma generating power P between 10 to 22 Watts, preferably at 20 W; and where the volume of gas flowing through a cold plasma unit with dielectric barrier discharge (DBD) structure is from 50 to 120 mL/minute, preferably at 60-90 mL/minute; and (d) performing the reforming reaction in the second reforming reactor from a temperature of 600° C. with a heating rate of 20° C./min to the transition temperature points, maintaining this reaction for 10 minutes before continuing the heating process to a higher temperature, which increases the conversion of $CO_2$-rich gas mixture into syngas where the conversion temperature is raised to 700° C., 750° C., 800° C., and 850° C., respectively.

Another object of the present invention is to use powder reforming catalyst having a general formula of $10Ni_2/Mg_{0.5}AlO_x$ with a mass content of Ni about 10%, Co about 2% and Mg/Al ratio of 0.5 is carried on the monolith carrier with a mass ratio of 20%.

Another object of the present invention is to use powder reforming catalyst synthesized by a method of co-precipitation by dripping simultaneously a mixture of nitrate salts including $Ni(NO_3)_2 \cdot 6H_2O$, $Co(NO_3)_2 \cdot 6H_2O$, $Mg(NO_3)_2 \cdot 6H_2O$ and $Al(NO_3)_3 \cdot 9H_2O$.

Another object of the present invention is to provide reforming catalyst synthesized by the following steps: (a) preparing a solution of NaOH as a co-precipitating agent; (b) dissolving a mixture of nitrate salts in distilled water; (c) simultaneously adding and stirring at 360 rpm the resultant nitrate salt solution and NaOH to the $Na_2CO_3$; (d) adjusting the pH of the mixture to between 8-12; (e) stirring the resulting suspension and aging it overnight; (f) cooling the mixture to room temperature, filtering and washing several times with distilled water to neutral pH (~7) and drying it to produce a double structured hydroxide (hydrotalcite) catalyst $10Ni_2Co/Mg_{0.5}AlO_x$; and (g) heating the resultant catalyst at 800° C. for six hours.

Another object of the present invention is to provide a method for synthesizing reforming catalysts, comprising the following steps: (a) finely grinding the $10Ni_2Co/Mg0.5AlOx$ catalyst obtained after the calcination to obtain a particle size between 2 and 5 μm and dispersing them into distilled water with a solid/liquid ration of 30 g/L to produce a stable colloidal milk glue using ultrasound at pH of 8 and for a duration of one hour; (b) Next, the monolith cordierite bar is manufactured (OEM) into a cylinder with diameter φ being 12 mm and length L being 30 mm and the frame surface is treated by sonicating the monolith frame in 90% methanol solution for 30 minutes at 60° C. and drying overnight at 110° C. to clean the surface of the structural frame; and (c) immersing the monolith frame in the catalyst solution axially, fixing it in the solution system at 30° C., for 5 minutes, blowing dry to remove any liquid from the surface of the monolith frame by hot air flow; then drying it at a temperature of 110° C. for 15 minutes and repeating this process of impregnation and drying 20 times with a dipping time of 1 minute until the active phase mass is about 20% of the mass of the monolith frame; (d) finally, treating the catalyst with heat at the temperature of 550° C. at a rate of 2° C./min for 3 hours to increase the catalytic activities.

Yet another object of the present invention is to perform step (c) by turning $CH_4$ in a cold plasma device with a DBD configuration having an electrical room that generates plasma output power between 15 to 20 Watts.

In another object of the present invention, step (c) above is performed by turning $CH_4$ in a cold plasma device with a DBD configuration having an electrical room that generates plasma output power at 20 Watts.

In another object of the present invention, step (c) above is performed by allowing a gas flow rate through the cold plasma device with a DBD configuration having an electrical room ranging from 50 to 120 mL/minute.

In another object of the present invention, step (c) above is performed by allowing a gas flow rate through the cold plasma device with a DBD configuration having an electrical room ranging from 60 to 90 mL/minute.

Yet another object of the invention is to provide a DBD cold plasma apparatus having an electrical chamber that can be used to lower the reforming reaction temperatures.

Finally, another object of the invention is to provide a reforming reactor that can sustain a temperature up to 900° C.; the reactor is equipped with cylindrical quartz having inner diameter of $\phi=8$ mm.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

The figures depict various embodiments of the technology for the purposes of illustration only. A person of ordinary skill in the art will readily recognize from the following discussion that alternative embodiments of the structures and methods illustrated herein may be employed without departing from the principles of the technology described herein.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Within the meaning of the present invention, any numeric value is understood to include the specified value itself as well as well those values within ±10%, ±5% of that numeric value. For example, the diameter of the catalyst material is specified to be $\phi=10$ mm, it should be understood that the diameter of 10 mm and values between 9 and 11 mm, 9.5 mm to 10.5 mm all within the scope of the present invention.

The present invention relates to the integration of cold plasma technology into a catalytic reforming process to convert a $CO_2$-rich gas mixture including natural gas and biogas into syngas consisted of $H_2$ and CO for the purpose of lowering the reaction temperature and thus reducing energy costs.

Figure 1:
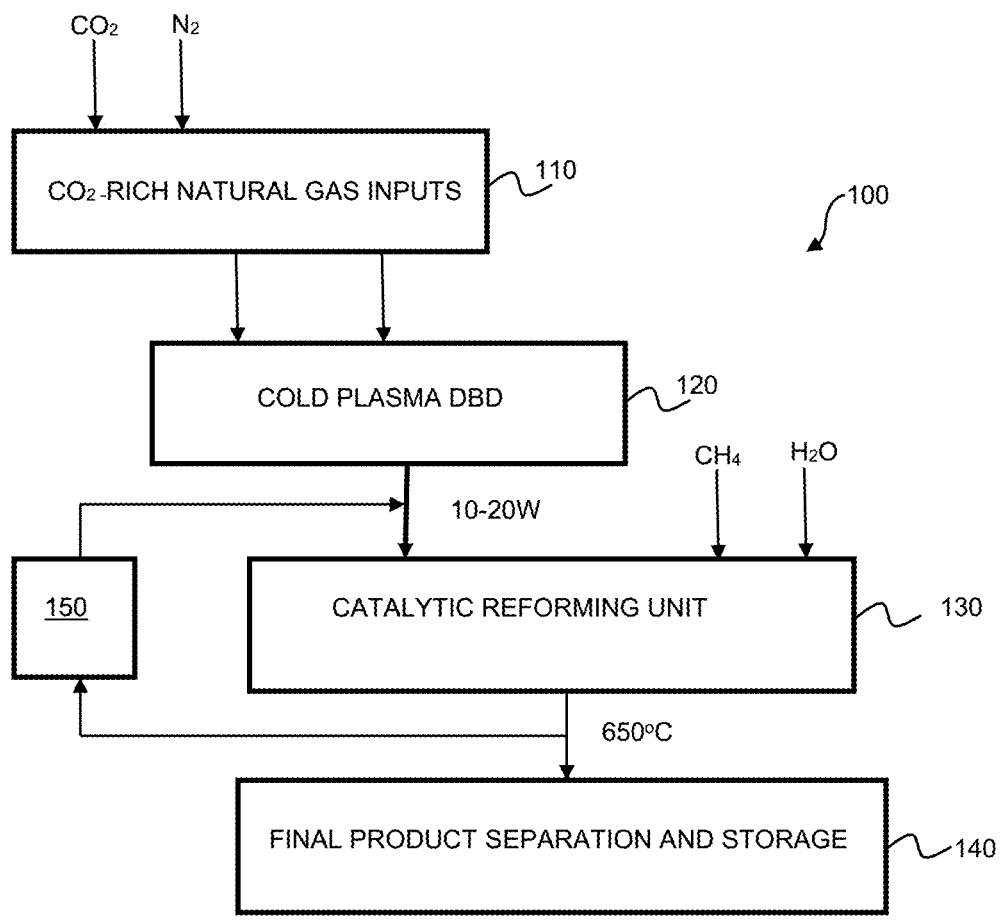
FIG. 1 is a block diagram illustrating the arrangement of a gas reforming system in accordance with an exemplary embodiment of the present invention.

Now referring to FIG. 1, a block diagram of a natural gas reforming system 100 ("system 100") that uses a cold plasma unit prior to and separately from the main reforming reactor in accordance with an exemplary embodiment of the present invention is illustrated. System 100 receives $CO_2$-rich natural gas source 110 and sends it to a dielectric barrier discharge (DBD) cold plasma unit 120 where carbon dioxide ($CO_2$) and nitrogen ($N_2$) are undergone dissociation and ionization reactions in a non-thermal (cold) plasma environment. The CO and O ions from the dissociation and ionization of $CO_2$ are used to react with $CH_4$ and $H_2O$ in a catalytic reforming reaction stage 130 to form various hydrocarbons such as $C_2H_6$, $C_3H_3$, $C_4H_{10}$, and $H_2$. Catalytic reforming reaction stage 130 receives CO and O ions to the catalytic reforming zone in a manner that avoids the recombination of CO and $O^{2-}$ back to $CO_2$. In many embodiments of the present invention, DBD cold plasma unit 120 is placed before and separate from catalytic reforming reaction stage 130. A sub-system 150 feedbacks the high temperature water steam to combine with the plasma converted natural gases to provide (a) latent heat of condensation; (b) convection currents; and (c) endothermic and exothermic heat exchanges. In addition, the output of DBD cold plasma unit 120 is placed as close as possible to the input of catalytic reforming reaction stage 130 so that CO, O, and radicals $C_2H_5^*$, $C_2H_3^*$ do not have the opportunities to recombine back to $CO_2$ and $CH_4$. The syngas consisting of $H_2$ and CO is finally separated into different components and stored in a final stage 140. A vapor-liquid separator or a flash drum is used to separate vapor components and liquid components.

Thus, from the description of FIG. 1, the following objectives can be achieved:
(a) coke formation is avoided;
(b) simple design of the catalyst reforming reactor is achieved; and
(c) energy efficiency due to convection currents, latent heat of condensation, and endothermic and exothermic heat exchange.

Figure 2:
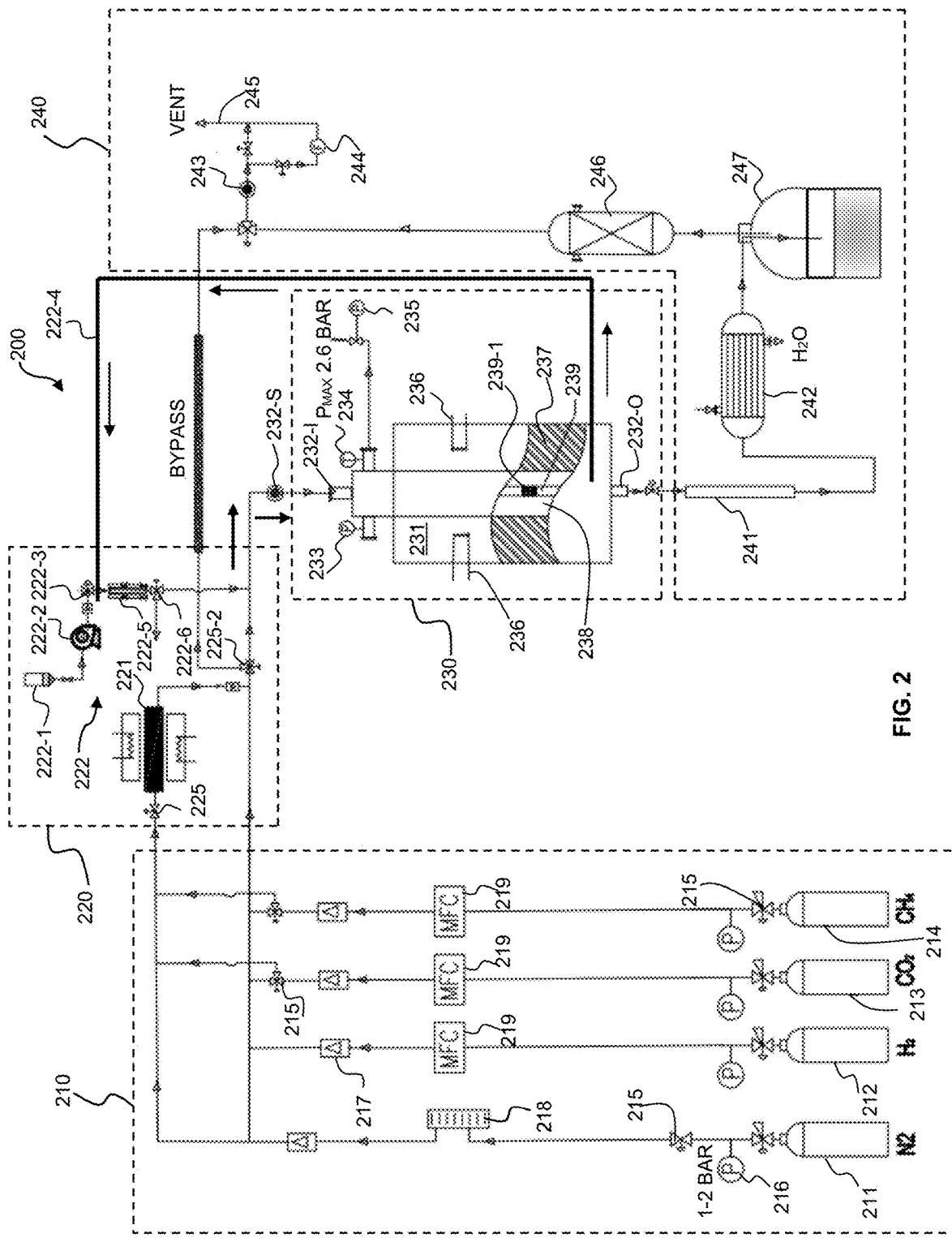
FIG. 2 is a schematic diagram of the natural gas reforming system in accordance with an exemplary embodiment of the present invention.

Next referring to FIG. 2, a schematic diagram of a gas reforming system 200 ("system 200") configured to reform biogas and natural gas into syngas at a small industrial scale in accordance with an exemplary embodiment of the present invention. Within the scope of the present invention, whenever the term system 200 is used, it is understood that system 200 is a dielectric barrier discharge (DBD) cold plasma system that includes a DBD cold plasma unit installed before and separately from the catalytic reforming unit as described in FIG. 1. In the block diagram level, system 200 includes an input source stage 210, a DBD cold plasma stage 220, a catalytic reforming reaction stage 230, and a product separation stage 240.

Referring again to FIG. 2, input source stage 210 includes, but not limited to, a nitrogen gas source 211, a hydrogen gas source 212, a carbon dioxide 213, and a methane source 214, all connected to pressure gauges 216, three-way (tri) directional valves 215, mass flow controllers (MFC) 218, and a one-way (uni) directional valves 219 for controlling the flowing rates of these gases into DBD cold plasma system 220. The flowing rates can reduce the coke deposition and improve the reaction efficiency of DBD cold plasma stage 220 and thus are an important and novel aspects of the present invention. In some embodiments of the present invention, $N_2$ gas source 211, $CO_2$ gas source 213, and methane $CH_4$ gas source 214 are directed to catalytic reforming reaction stage 230 without being ionized by DBD cold plasma system 220 first. Nitrogen ($N_2$) source 211 is connected to a bubble flow meter 218 and a convection current and latent heat system 222. Sub-system 222 is designed to form a convection current circulation and latent heat of condensation release from the output of a catalytic reforming stage 230 to the output end of DBD cold plasma unit 221. Sub-system 222 includes a water source 222-1, a water pump 222-2, a bidirectional valve 222-3, a water tank with heater 222-4, and a tri-directional valves 225-2. A water feedback line 223 takes very high temperature water vapors from the output of catalytic reformer stage 230 and efficiently releases the latent heat of water to water tank 222-5. The flow rate of water feedback line 223 is controlled so that the temperature at the output of DBD cold plasma stage is maintained at 110° C.

Continuing with FIG. 2, catalytic reforming reaction stage 230 includes an catalytic reforming reactor 231 which includes an infeed 232-I, an insulator section 236, heaters 236, endothermic steam chamber 238, a catalytic reforming reactor core 239 which contains a catalyst layer 239-1, and an outlet 232-0. A pressure gauge 233 and a thermal coupler 234 to monitor the pressure and temperatures of catalyst reformer unit 230. An infeed sample connector 232-S is designed to sample and monitor the plasma output. System 200 further comprises, at its final stage, product separation stage 240 that includes an infeed tube 241, a condenser unit 242, a flash drum unit 247 that receives inputs from condenser unit 242 and a zeolite column unit 246 which receives gases from input source stage 210. Zeolite column unit 246 carries out catalytic reactions that separate different syngas. A safety unit includes a safety outlet 243, a flow meter 244, and a vent 245 operable to release the pressures from product separation stage 240, catalytic reforming reaction stage 230, and DBD cold plasma stage 220.

Still referring to FIG. 2, in operation, system 200 reforms a $CO_2$-rich gas mixture feedstock to produce syngas by cold plasma technology placed prior to and separate from the reforming reactions. In addition, system 200 includes subsystem 222 from the output of catalytic reforming reactor 230 to output of DBD cold plasma stage 220. More particularly, system 200 operates by performing the following steps: (a) preparing reforming catalysts for catalytic reforming reaction stage 230. In many embodiments of the present invention, catalyst layer 239-1 is a Nickel (Ni) based catalyst in powder form. The mass percentage (w %) of Ni metal is 10% by mass, and magnesium (Mg) of 5% by mass, both carried by $Al_2O_3$ carrier. The reforming catalyst has a monolithic or foam structure with the dimension of $\phi=10-12$ mm, $L=10-30$ mm. The reforming catalyst is loaded into catalytic reforming reactor core 239 with a bulk length less than $\frac{1}{10}$ of the reactor tube length. The catalyst redox reactions occur inside catalytic reforming reactor core 239. A stream of nitrogen ($N_2$) gas from nitrogen ($N_2$) source 211 is continuously passed through catalytic reforming reactor core 239 with a flow rate between 50 to 100 mL/min until hydrogen ($H_2$) reduction is completed. The flow rate of $N_2$ gas is controlled by bi-directional valve 215, uni-directional valve 217, and tri-directional valve 215-2. The temperature inside catalytic reforming reactor core 239 is increased from room temperature to the reduction reaction temperature of 800° C. As the temperature reaches 800° C., hydrogen ($H_2$) gas from $H_2$ source 212 is passed into catalytic reforming reactor core 239 at the flow rate of 60 mL/min to reduce the catalyst for a duration of 1 hour to bring the active phase to the metallic state, and to end the reduction reaction process. Then the temperature of catalytic reforming reactor core 239 is reduced to 700° C.

Continuing with FIG. 2, feeding the Ni-based catalyst into catalytic reforming reactor stage 230 where a mixture of gas inputs including $CH_4$, $CO_2$, and $H_2O$ from $CH_4$ gas source 215, $CO_2$ gas source 213, and water steam from convection current and latent heat unit 222. The constant volume of $CH_4/CO_2/H_2O$ is set at 2.5/1/2 respectively. The $CH_4$ gas is first turned to plasma in DBD cold plasma unit 231 with $CH_4/N_2$ ratio of 1:1 with plasma generating power P between 10 to 22 Watts, preferably at 20 W. The volume of gas flowing through DBD cold plasma unit 231 at a flow rate from 50 to 120 mL/minute, preferably at 60-90 mL/minute. Again, the flow rates of these gases are controlled by MFC 219, tri-directional valves 215, bi-directional valves 215, and uni-directional valves 217. The reforming reactions in the reforming reactor 231 occur at a temperature of 600° C. with a heating rate of 20° C./min to the transition temperature points. The reforming reactions are maintained for 10 minutes before the heating process is elevated to a higher temperature. This increases the conversion of $CO_2$-rich gas mixture into syngas where the conversion temperature is raised to 700° C., 750° C., 800° C., and 850° C., respectively.

Continuing with FIG. 2, catalytic reforming reactor 231 uses reforming catalyst in form of powder having a general formula of $10Ni_2/Mg_{0.5}AlO_x$ with a mass content of Ni about 10%, Co about 2% and a Mg/Al ratio of 0.5. This powder catalyst is carried on a monolith carrier with a mass ratio of 20%. In another embodiment of the present invention, catalytic reforming unit 231 uses powder reforming catalyst synthesized by a method of co-precipitation by dripping simultaneously a mixture of nitrate salts including $Ni(NO_3)_2 \cdot 6H_2O$, $Co(NO_3)_2 \cdot 6H_2O$, $Mg(NO_3)_2 \cdot 6H_2O$ and $Al(NO_3)_3 \cdot 9H_2O$. In other aspects of the present invention, catalytic reforming unit 231 is equipped with a reforming catalyst synthesized by the following steps: (a) preparing a solution of NaOH as a co-precipitating agent; (b) dissolving a mixture of nitrate salts in distilled water; (c) simultaneously adding and stirring at 360 rpm the resultant nitrate salt solution and NaOH to the $Na_2CO_3$; (d) adjusting the pH of the mixture to between 8-12; (e) stirring the resulting suspension and aging it overnight; (f) cooling the mixture to room temperature, filtering and washing several times with distilled water to neutral pH (~7) and drying it to produce a double structured hydroxide (hydrotalcite) catalyst $10Ni_2Co/Mg_{0.5}AlO_x$; and (g) heating the resultant catalyst at 800° C. for six hours.

Figure 3:
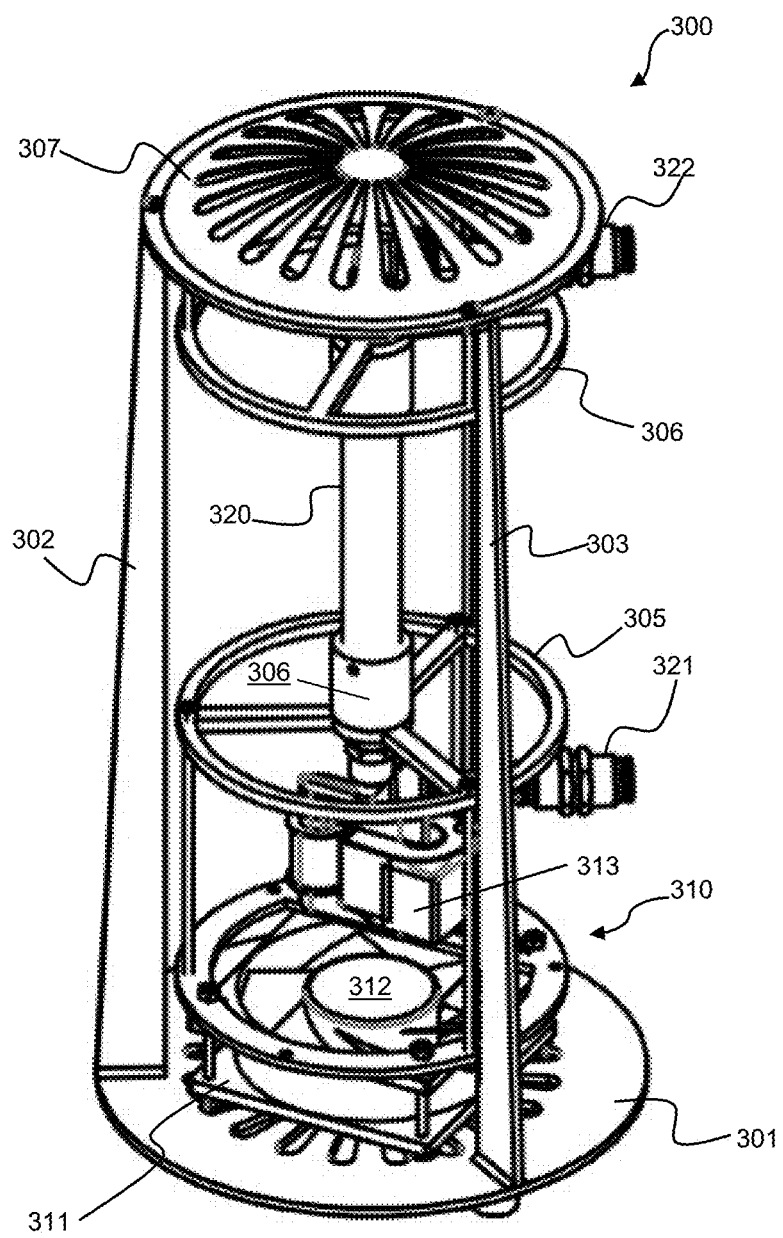
FIG. 3 is a 3D diagram of plasma reactor in accordance with an exemplary embodiment of the present invention.

Next referring to FIG. 3, a three-dimensional (3D) perspective diagram of a practical dielectric barrier discharge (DBD) cold plasma unit 300 "DBD cold plasma unit 300" is illustrated. DBD cold plasma unit 300 is a non-thermal plasma that has dielectric barrier discharge (DBD) configuration that is designed to use separately from the catalytic reforming reactor. Therefore, in many embodiments of the present invention DBD cold plasma unit 300 does not contain catalysts for the reforming reactions. DBD cold plasma unit 300 provides high energy to the electrons at 1-10 eV while the gas is in the room temperature. This cold plasma gas is then sent to separate catalytic reforming unit 230. The effects of separate out DBD cold plasma unit 300 from catalytic reforming unit 230 is to (a) avoid the heavy coke deposition and (b) the recombination of the gas back to their original forms, thus improving the efficiency of the DBD cold plasma unit 300.

Continuing with FIG. 3, DBD cold plasma unit 300 includes a base 301, vertical supporting columns 302-304, a top protecting lid 307, a heat dissipating unit 310, a power supply unit 313, an input side supporting ring 305, an output side supporting ring 306, a gas inlet connector 321, an outer electrode 323, a cold plasma reactor 320, a top supporter 306, and an gas outlet connector 322. Base 301, input side supporting ring 305, output side supporting ring 306, and top protecting lid 307 are connected together by vertical supporting columns 302-304, forming a protecting mechanical frame for cold plasma reactor 320. Heat dissipating unit 310 further comprises a heat sink plate 311 connected to a fan 312 all screwed tightly to base 301. Power supply unit 313 laid directly on top of heat dissipating unit 310 so as the heat is dissipated downward toward base 301. Gas inlet connector 321 receives natural gases. These natural gases are passed through cold plasma reactor 320. The plasma treated natural gases are output via gas outlet connector 322.

Figure 4:
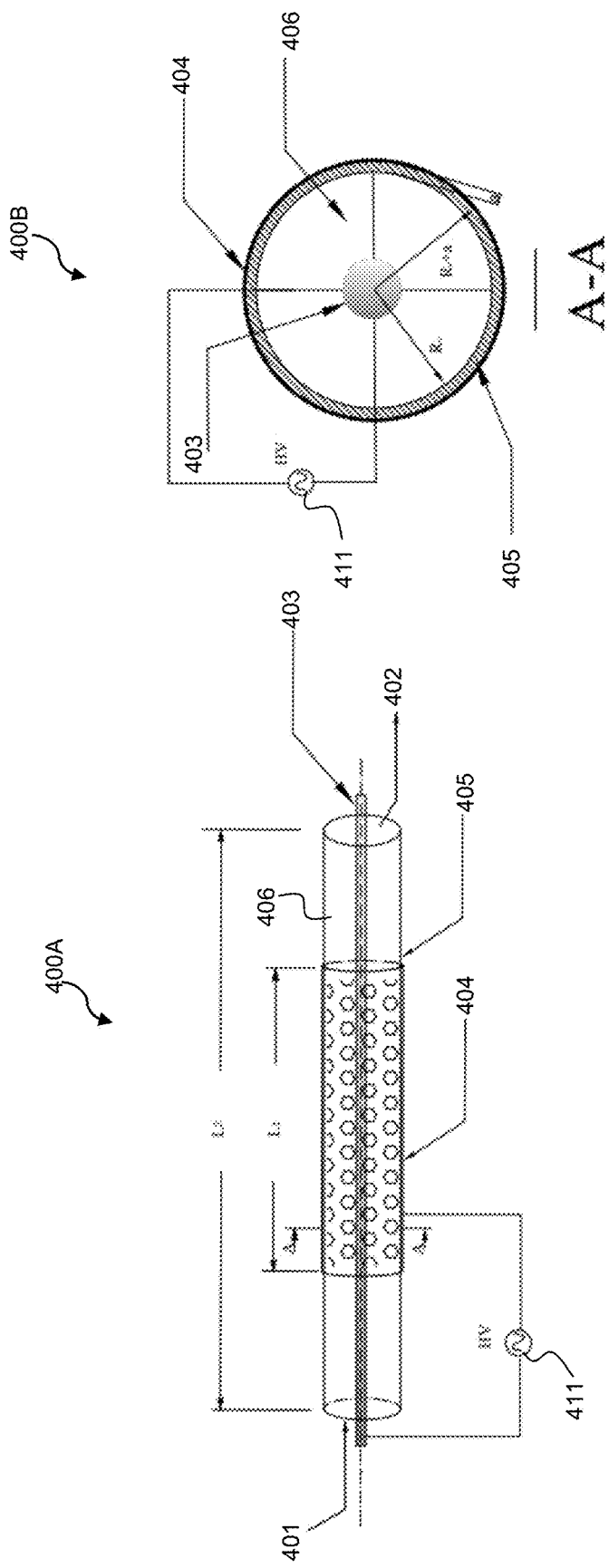
FIG. 4A is a 2D diagram of a dielectric barrier discharge (DBD) cold plasma reactor in accordance with an exemplary embodiment of the present invention.
FIG. 4B is a cross-sectional view of the DBD cold plasma reactor.

Next referring to FIG. 4A, a schematic diagram of a cold plasma reactor 400A in accordance with an exemplary embodiment of the present invention is illustrated. Cold plasma reactor 400 is a schematic diagram representation of cold plasma reactor 320 of DBD cold plasma 300. Cold plasma reactor includes an input terminal 401 where natural gases are permitted to enter, an output terminal 402, an inner electrode 403, a mesh outer electrode 404, a dielectric layer 405, and a discharge gap 406. Mesh outer electrode 404 and inner electrode 403 are connected to a high voltage power supply source 411. In FIG. 4B, a cross-section 400B from a cut AA' shows that cold plasma reactor 400A has a cylindrical shape with inner electrode 403 at the center and inner radius R and an outer radius R+a, where a is the thickness of dielectric layer 404. Radius R is also discharge gap 406.

Figure 5:
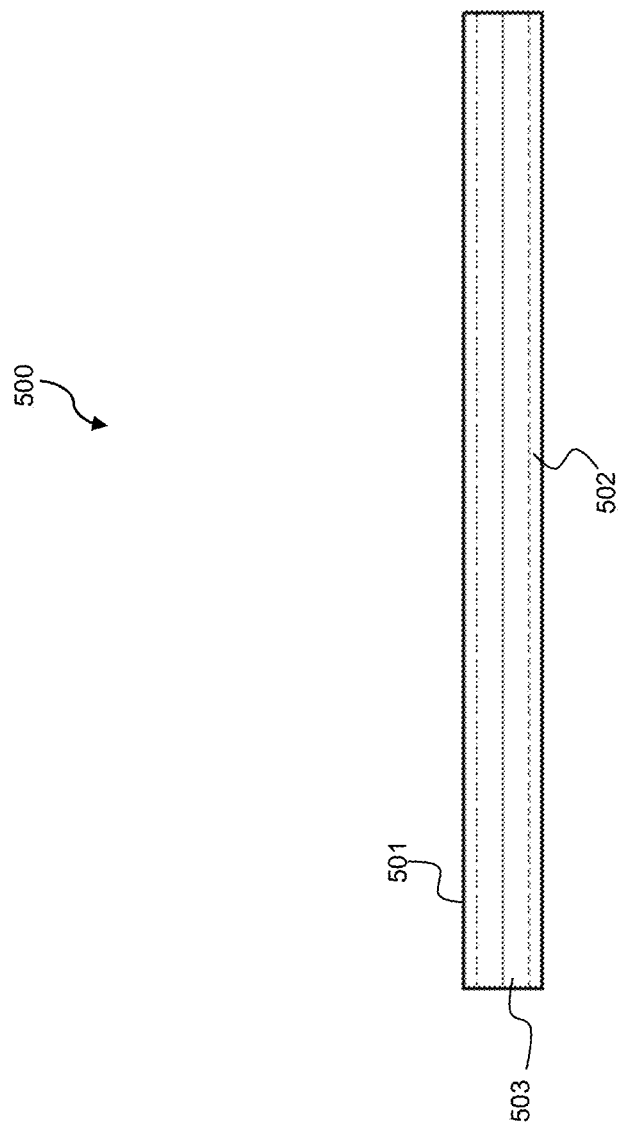
FIG. 5 is a 2D structure of the dielectric layer used in the DBD cold plasma reactor in accordance with an exemplary embodiment of the present invention.

Referring to FIG. 5, a geometrical shape of a dielectric layer 500 used in the DBD cold plasma reactor in accordance with an exemplary embodiment of the present invention is illustrated. Dielectric layer 500 has a cylindrical shape with an outer surface 501, an inner surface 502 and an inner hollow space 503. In many embodiments of the present invention, dielectric layer is made of Pyrex material with inner hollow space 503 having a radius of 8 mm, outer surface 501 having a radius of 12 mm, and a length of 150 mm. Other materials may be used for dielectric layer 404 includes glass, quartz, ceramics, enamel, mica, plastics, silicon rubber, and Teflon. Discharge gap for DBD cold plasma is between 0.1 mm to 10 mm. In many preferred embodiments of the present invention, Pyrex material is used and the discharge gap or inner hollow space 503 is 4 mm.

Figure 6:
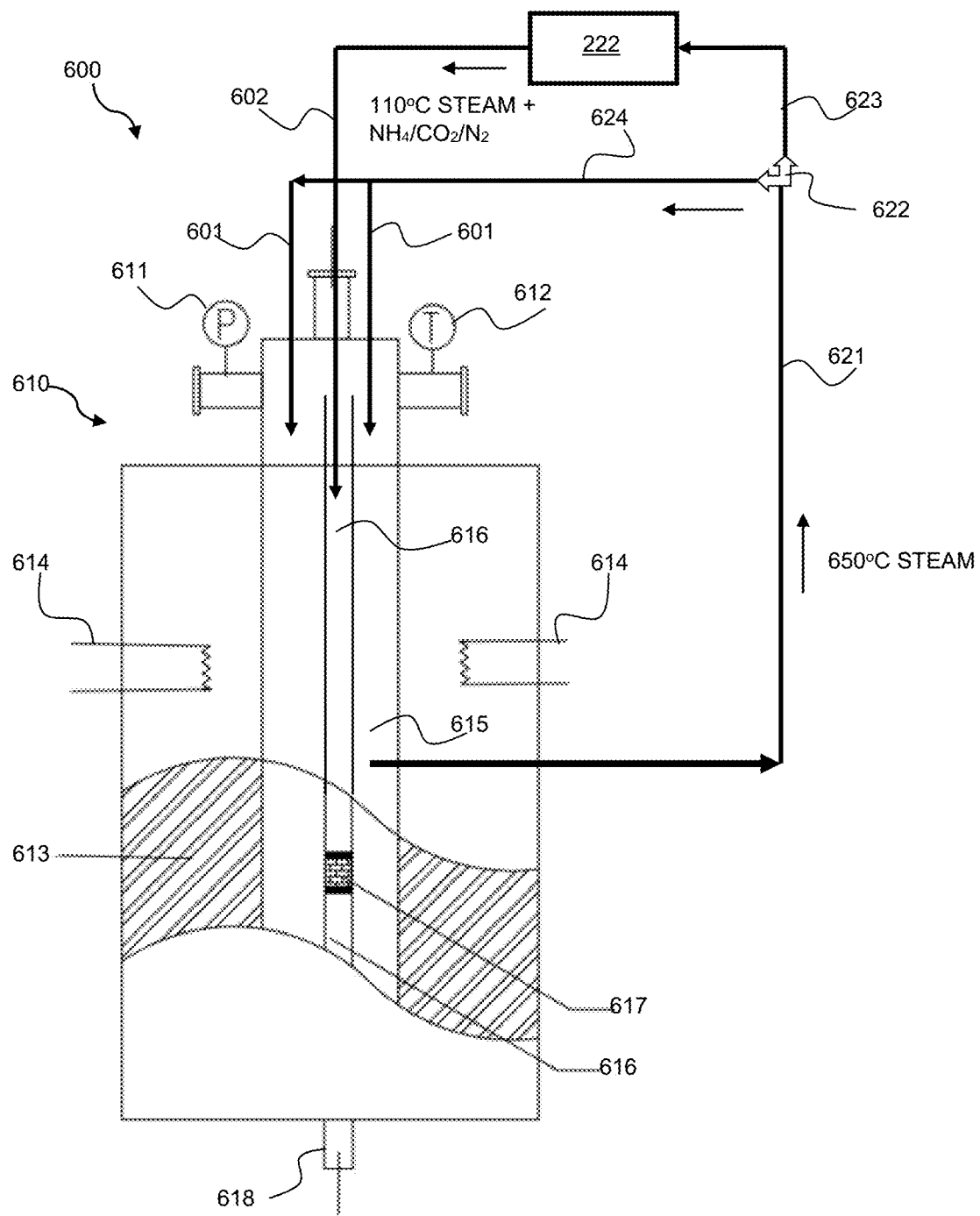
FIG. 6 is a 2D diagram of a catalytic reforming reactor and the convection currents, endothermic/exothermic reactions, and latent heat scheme to achieve energy efficiency in accordance with an exemplary embodiment of the present invention.

Next, referring to FIG. 6, a schematic diagram of a single-chamber catalytic reforming reaction system 600 ("system 600") in accordance with an exemplary embodiment of the present invention is illustrated. In the first note, system 600 is energy efficient since the heat is circulated and latent heat is used to heat up the water. In addition, system 600 ensures that plasma gases are thrust into catalytic reforming reactor with the assistance of the convection currents between the hot and cold environments surrounding system 600. A sub-system 222 is designed to form a convection current circulation and latent heat transfer from the output of a catalytic reforming unit 230 to the output end of DBD cold plasma unit 221. As shown above in FIG. 2, sub-system 222 includes a water source 222-1, a water pump 222-2, a bidirectional valve 222-3, a water tank 222-4, and a tri-directional valves 222-5. A water feedback line 223 takes very high temperature water vapors from the output of catalytic reformer unit 230 and efficiently releases the latent heat of water to water tank 222-4. The flow rate of water feedback line 223 is controlled so that the temperature is maintained at 110° C.

Continuing with FIG. 6, catalytic reforming reaction unit 610 includes a gas input infeed 602, a steam input feed 601, a pressure gauze 611, a heat sensor 612, an insulator section 613, heaters 614, a water steam chamber 615, a reforming reactor core 616 which contains a catalyst layer 617, and an output terminal 618. Pressure gauge 611 and a heat sensor 612 are used to monitor the pressure and temperatures of catalyst reforming reaction unit 610. System 600 further comprises a steam input feedback 621 that takes the water steam from steam chamber 615 back to sub-system 222. A two-way valve 622 is configured to deliver the water steam via a first steam feedback 623 all the way to steam input feed 601. In the second route, steam is feedback to sub-system 222 via a second steam feedback 624. Sub-system 222 combines the input natural gases and the water steam and delivers to gas input feed 602 and led directly to reforming reactor core 616. After the endothermic catalytic reactions with catalyst materials 617, syngas is lead out via output terminal 618. Because of the structure of catalytic reforming reaction unit 610, exothermic reaction in water steam chamber 615 and endothermic reaction of reforming reactor core 616 causes heat transfer that reduces the energy input into insulator section 613.

Figure 7:
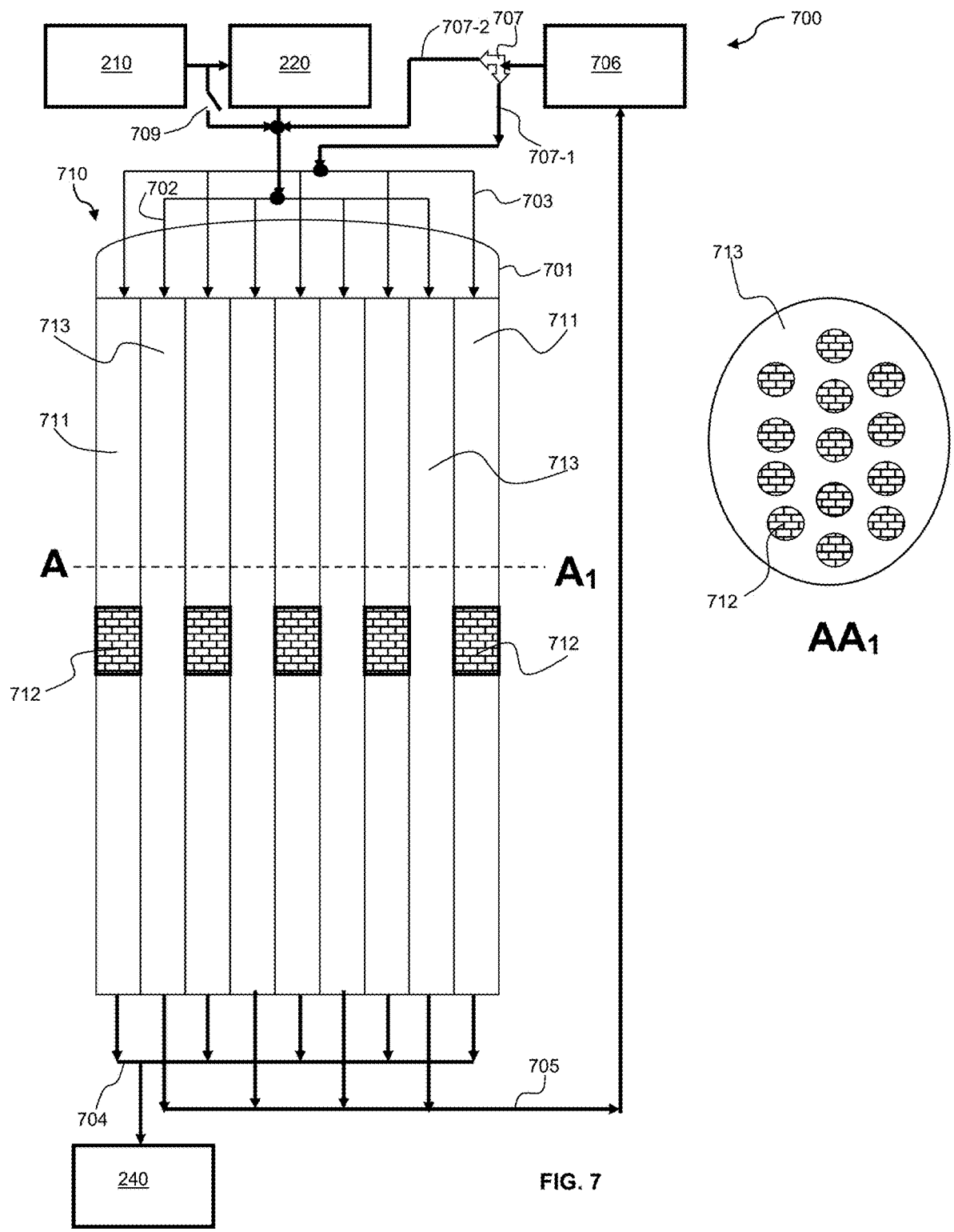
FIG. 7 is a 2D diagram of another type of catalytic reforming reactor and the convection currents, endothermic/exothermic reactions, and latent heat scheme to achieve energy efficiency in accordance with an exemplary embodiment of the present invention.

Next, referring to FIG. 7, another embodiment of a multiple-chamber catalytic reforming reaction system 700 ("system 700") in accordance with an exemplary embodiment of the present invention is illustrated. In system 700, a catalytic reforming reactor unit 710 is used. Catalytic reforming reactor unit 700 includes a container 701 with a plurality of endothermic reactors 711 placed next to exothermic reactors 713. In each endothermic reactor 711, a catalytic material 712 is placed to assist in the reforming reactions. Syngas output from each endothermic reactor 711 are combined and led out by a first multiple outlets 704 to product separation stage 240. All steam outputs of exothermic reactor 713 are combined and fed back to a storage tank 706 via a second multiple outlets 705. A two-way valve 707 splits hot steam output from second multiple outlets 705 into two sources. In a direct steam input 707-1, the first hot steam output is fed to a second multiple inlets 703 which, in turn, receives hot water steam in exothermic reactors 713. In a direct steam input 707-2, a second source of hot steam output is combined with the cold plasma gases from DBD cold plasma unit 221 and input natural gases from gas input stage 210 via the control of a switch valve 709.

Continuing with FIG. 7, when steam output at 650° C. to 800° C. is delivered to storage tank 706, a latent heat of condensation is released. When a substance changes phase, the arrangement of its molecules changes, but its temperature does not change. If the arrangements as shown in FIG. 7 has a higher amount of thermal energy, then the substance releases thermal energy from its environment in order to make the phase change. If the new arrangement has a lower amount of thermal energy, the substance releases thermal energy to its environment. Latent heat of condensation is energy released when water vapor condenses to form liquid droplets. The latent heat of condensation is defined as the heat released when one mole of water condenses. The temperature does not change during this process, so heat released goes directly into changing the state of the substance. It is expressed as kg/mol or kJ/mol. The energy released in this process is called heat of condensation. The heat of condensation of water is about 2,260 kJ/kg, which is equal to 40.8 kJ/mol, a physical property of water. It is defined as the heat required to change one mole of liquid at its boiling point under standard atmospheric pressure. It is expressed as kg/mol or kJ/kg. When a material in liquid state is given energy, it changes its phase from liquid to vapor; the energy absorbed in this process is called heat of vaporization. The heat of vaporization of water is about 2,260 kJ/kg, which is equal to 40.8 kJ/mol.

Continuing with FIG. 7, since the endothermic reactions ($\Delta H>0$) in endothermic reactors 711 contact directly with exothermic reactions ($\Delta H<0$) of heating water in exothermic reactors 713, it does not require a lot of energy to provide thermal energy to endothermic reactors 711. Thus, energy is saved. In addition, the closed thermodynamic system formed between sub-system 222 and catalytic reforming reactor 701 create convection currents that cause plasma gases from DBD cold plasma unit 220 to enter first multiple inlets 702. This is an advantage of the present invention because plasma gases tend to recombine to form $CH_4$ and $CO_2$.

Figure 8:
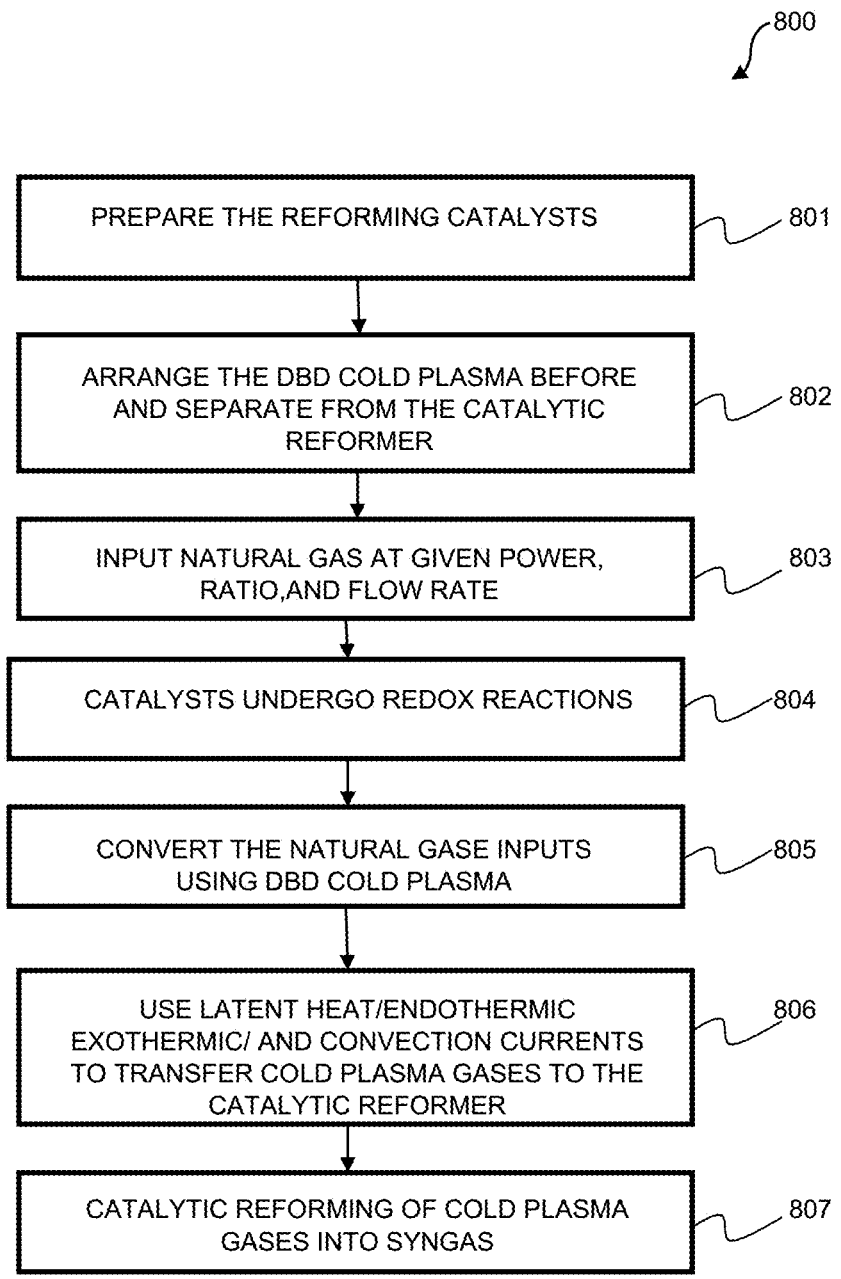
FIG. 8 is a flow chart of a method of catalytically converting natural gases into syngas using a separate dielectric barrier discharge (DBD) cold plasma in front of a catalytic reforming reactor with convection currents, endothermic/exothermic reactions, and latent heat delivery scheme in accordance with an exemplary embodiment of the present invention.

Next referring to FIG. 8, a flow chart of a method 800 of reforming natural gases including biogases into syngas using separate dielectric barrier discharge (DBD) cold plasma unit and catalytic reforming reactor in accordance with an exemplary embodiment of the present invention is illustrated. Method 800 is performed with system 200, system 600, and system 700 described above.

At step 801, reforming catalysts are prepared. Step 801 is realized by finely grinding the $10Ni_2Co/Mg0.5AlOx$ catalyst obtained after the calcination to obtain a particle size between 2 and 5 μm and dispersing them into distilled water with a solid/liquid ration of 30 g/L to produce a stable colloidal milk glue using ultrasound at pH of 8 and for a duration of one hour. Next, the monolith cordierite bar is manufactured (OEM) into a cylinder with diameter φ being 12 mm and length L being 30 mm and the frame surface is treated by sonicating the monolith frame in 90% methanol solution for 30 minutes at 60° C. and drying overnight at 110° C. to clean the surface of the structural frame. The monolith frame is immersed in the catalyst solution axially. The catalyst solution is fixed in a solution system at 30° C., for 5 minutes. Then the monolith frame is blow dried using hot air flow to remove any liquid from the surface. Then the monolith frame is dried at a temperature of 110° C. for 15 minutes. The above steps of impregnating and drying are repeated about 20 times with a dipping of 1 minute until the active phase mass is about 20% of the mass of the monolith frame. Finally, the catalyst is treated with 550° C. heat at a rate of 2° C./min for 3 hours to increase catalytic activities. In other aspects of the present invention, step 801 is realized by using the nickel-based reforming catalyst material 617 has the form of a monolith or foam channel structure. They are machined to a dimension of 0=10 mm x L=10-30 mm. The catalyst block length is less than 1/10 of the reaction tube length to reduce the effect of thermal gradients in high heat gain/emission reactions. Powder forming catalyst with the main composition of Ni—$Mg_xAlO_x$ with 10 wt % Ni, is put on the structural framework by wet depositing method with 20% mass. Above and below the catalyst layer are two layers of quartz cotton that fix the layers of reaction.

At step 802, a dielectric barrier discharge (DBD) cold plasma unit is arranged before and separate from a catalytic reforming unit. Step 802 is realized by system 200 in FIG. 2. DBD cold plasma stage 220 is placed in front of catalytic reforming reaction stage 230. DBD cold plasma unit 221 turns CH$_4$ gas to a plasma output having power between 15 to 20 Watts. In some preferred embodiments, DBD cold plasma unit 221 turns CH$_4$ gas to a plasma output having power of 20 Watts. In some embodiments of the present invention, the gas flow rate through DBD cold plasma unit 221 with a dielectric barrier discharge (DBD) configuration having a discharge space ranging from 50 to 120 mL/minute. In some embodiments of the present invention, the gas flow rate through DBD cold plasma unit 221 with a DBD configuration having a discharge space ranging from 60 to 90 mL/minute.

Yet in some other embodiments of the present invention, DBD cold plasma unit 221 having the Dielectric Barrier Discharge (DBD) configuration with the parameters listed in Table 2.

TABLE 2

Specifications of DBD Cold Plasma Unit

| Components/Parts | Specifications |
| --- | --- |
| Electrode Core | Stainless Steels, 2 mm, 2.2 mm, and 4 mm |
| Length of the Electrode Core | 20 cm |
| Dielectric Layer | Pyrex |
| Thickness of the Dielectric Layer | 2 mm |
| Diameter of the Dielectric | 12 mm |
| The Length of the Dielectric Layer | 15 cm |
| Discharge Distance | 3 mm |
| External Electrode | Stainless Steel |
| The Length of External Electrode | 5 cm |
| AC Power Supply | 1-10 kV |
| Input Power | 50-500 W |
| Frequency | 20-60 Hz |

Continuing with step 802, catalytic reforming reaction unit 231 includes a reactor chamber where the temperature can reach to 900° C., a cylindrical quartz catalysts with inner diameter of 8 mm. In many embodiments of the present invention, cold plasma is used to soften the catalytic materials for the reforming reactions. More particularly, DBD cold plasma unit 221 is separate and placed in front of catalytic reforming reaction unit 231. In addition, the operating parameters of this process such as power supply, residence time need to be adjusted in order to achieve the optimal reaction efficiencies. Reforming reactor core 616 is attached to catalytic reforming reaction unit 231. The two ends of reforming reactor core 616 are sealed with heat-resistant rubber washers. Test the system for leaks with N$_2$, using soap bubbles to check until there are no air leaks. Reagent sources are checked and connected (1) internal standard N$_2$ gas (99.99% wt), pressure applied about 2-3 bar (1 bar=0.1 Mpa); (2) CH$_4$ gas (99.99% wt), pressure applied is about 2-3 bar; (3) CO$_2$ (99.99% wt), pressure applied is 2-3 bar; (4) O$_2$ (99.99% wt), dehumidified with technical compressed air (humidity <5% wt), pressure level at 3 bar; (5) industrial alcohol; (6) double distilled water.

At step 803, natural gases at given power, ratio (wt %), and flow rate are input into system of step 802. Step 802 is realized by system 200, system 600, and system 700 above with the following specifications and descriptions.

Input Power:

The input power is an important factors to determine the ability to soften the catalysts. New molecules are formed through the collisions with high energy electrons in the discharge gap 406. Therefore, as the electrical energy increases, the energy level and the charge densities released from DBD cold plasma unit 221 increase. Accordingly, the probabilities of collision and the formation rate of syngas increase. Increasing the input power to DBD cold plasma unit 221 via voltage power supply source 411 increases the amount of CH$_4$ reformed to other compounds. However, high input power promotes the direct dissociation of CH$_4$ into coke that sticks to dielectric layer 404, adversely affecting DBD cold plasma unit 221. Therefore, the present invention discovers the optimal input power that resolves the input power problems.

Plasma Residence Time:

The residence time in discharge gap 406 is defined as the time it takes for the gas to enter discharge gap 406 until it exits therefrom. The residence time is calculated according to Equation 1 (CT. 1). Equation 1 shows that the retention time of the gas can be changed by changing the gas flow rate or changing the length of electrode 403. With a fixed dielectric barrier discharge (DBD) plasma unit 221, it is less expensive to vary the residence time by varying the flow rate. When the flow rate is fast, the collision between the gas molecules and electrons from unit 221 is limited, so the conversion efficiency of the material is reduced.

$$RT = \frac{L}{F/A} \tag{CT1}$$

where:
RT=residence time;
F (mL/p): the flow rate of the incoming gas
L (cm): length of the electrode;
A: area of the electrical discharge The following embodiments are intended to be illustrative of the present invention to teach one of ordinary skill in heart to make and use the invention and are not intended to limit the scope of the invention in any way.

Dielectric Materials

Dielectric layer 404 plays an important role in the charge-discharge mechanism since the excitation, ionization, and dissociation are directly related to the dielectric constant. In dielectric barrier discharge (DBD) cold plasma unit 221, dielectric layer 404 include quartz, aluminum oxide, alumina, Pyrex. In the present invention, Pyrex is used as a preferred embodiment. Pyrex or low dielectric loss heat resistant glass is the trade name for borosilicate glass produced by heating silica sand and boric oxide at extremely high temperature for a long period of time. The molten material is then processed into different types of glass. In the present invention, Pyrex is obtained from commercial manufacturers and retailers.

Dilution of Gases

The reaction occurred in dielectric layer 404 are by collisions between electrons. This collision is uncontrollable. Therefore, it often causes coke reactions on the surfaces of inner electrode 403. Some inert gases such as Argon (Ar), Helium (He), Nitrogen (N$_2$), etc. added to dielectric layer 404 to improve the degree of dissociation and change the discharge characteristics. In the present invention, Nitrogen (N$_2$) is preferred because when more than 50% of N$_2$ is added, the conversion of carbon dioxide (CO$_2$) increases and improves energy consumption. However, due to the presence of N$_2$ in the CO$_2$/N$_2$ mixture, undesirable NOx byproducts are formed at a concentration ranging from 100-125 ppm. The effect of N$_2$ on CH$_4$ conversion is similar to that of CO$_2$. The addition of N$_2$ gas in the NH$_4$ and CO$_2$ gases increases the charge density, leading to more collisions, improving the conversion efficiency. In addition, the presence of N$_2$ also reduces electron energy, thereby limiting the dissociation of $CH_4$ into coke. The direction of formation of intermediates using noble gases are chemically inert and thus do not form undesirable byproducts. However, because the products of plasma process are the input source to the reforming reaction, when using noble gases, it is necessary to separate the noble gas first. This process is complex and expensive.

Continuing with step 803, based on the raw material ratios $CH_4/CO_2/O_2/N_2$ and the volumetric space velocity (GHSV) value ~72-288 $L/(g_{cat} \cdot h)$, the ingredients are calculated and grade controlled into the system through the metric flow controller (MFC) flow regulator, Gas mixtures that can be introduced into the plasma system include $CH_4$, $CO_2$ and $N_2$ (inert gas), however, as a preferred embodiment, it is preferable to use a $CO_2/N_2$ mixture. The volume ratio of $CO_2/N_2$ that can be used is from 2:1 to 1:2 but preferably in a 1:1 ratio. The gas flow rate entering the plasma system can vary from 30-150 ml/min but preferably in the range of 50-90 ml/min and preferably at 60 ml/min. This mixture ratio facilitates the subsequent reforming process. The amount of gas introduced will directly affect the retention time of the reagents as well as the $CO_2$ conversion in the plasma region.

Next, at step 804, catalysts are undergone reduction oxidation reactions (redox) reactions. Compounds CO and $O_2$ are generated, which are oxidizing agents in the reforming process. Because the bond breaking energy in the $O_2$ molecule (146 kJ/mol) is much lower than that of $CO_2$ and $H_2O$. $CH_4$ reacts more readily with $O_2$ than other materials.

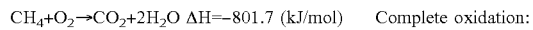

$CH_4 + O_2 \rightarrow CO_2 + 2H_2O \; \Delta H = -801.7 \text{ (kJ/mol)}$    Complete oxidation:

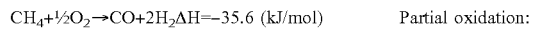

$CH_4 + \frac{1}{2}O_2 \rightarrow CO + 2H_2 \Delta H = -35.6 \text{ (kJ/mol)}$    Partial oxidation:

In the redox reactions, methane ($CH_4$) is partially oxidized to CO and $H_2$ (syngas) favorably at a right temperature between about 700° C. and 900° C. In the temperature range of 650° C., complete oxygen reaction occurs preferentially with 100% $O_2$ conversion. It is noteworthy that the temperature of the thermal combustion reaction is quite large ($\Delta H = -801.7$ (kJ/mol)), this heat creates catalytic regions with higher temperatures than the furnace's feed heat. Heat has the effect of promoting the conversion of $CH_4$ and $CO_2$ materials (self-heating effect). Once in position, the $N_2$ gas stream is allowed to pass through catalytic reforming reaction unit 231 continuously until hydrogen reduction happens. The pre-heater is started and the temperature is raised from room temperature to a catalytic reduction temperature of 800° C. A flow of hydrogen gas with a flow rate of 60 mL/min was used to reduce the catalyst for one hour to bring the active phase to the metallic state. At the end of the reduction process, the reactor temperature is brought back to 600° C. Set plasma process control parameters, including: Dielectric parameters including dielectric material and dielectric layer thickness. Materials used as dielectrics can use quartz, Pyrex and glass (characterized by dielectric constants of 3.8, 4.8 and 6, respectively). It is best to use Pyrex because of the economy and flexibility in use (popularity of the material) next. The dielectric layer thickness can vary from 1-3 mm but preferably between 1.8 and 2.2 mm and preferably at 2 mm. Plasma output power from 5 to 25 W where better range is from 10-22 WW, better is 15-20 W and preferably at 20 W; retention time of the reagent: the retention time of the reagent can be changed through the gas flow rate (Q) and the discharge zone length L (electrode length). At the best Q at 60 ml/min as set above, L can vary between 3-12 cm (or retention time varies from 1.5 to 5 s) and preferably in the range of 8-10 cm and best at 9 cm (retention time is 3.5 s); take the mixed gas flow of $CO_2$, $N_2$ through the plasma system, take samples for analysis of components in the bypass before going to the reforming system.

Next, at step 805, natural gases including biogases are converted into electron radicals or plasma catalysts using DBD cold plasma. Step 805 is realized by DBD cold plasma unit 221 in FIG. 2. In cold plasma technology, the gas temperature is maintained at the room temperature, while the electrons are excited to 1-10 electron volts (eV). At this energy level, the electron temperature is very high up to several thousand degree Celsius. These high energy electrons are used to activate inert molecules such as carbon dioxide ($CO_2$) and methane ($CH_4$). Consequently, a wide range of chemically reactive species including radicals that excite atoms, molecules, and ions. This energy, generated at low temperature, have the potential to initiate different reactions. This advantage can be used to reduce the kinetic barriers in the biogas conversion reactions. Additionally, thermodynamically stable biogas conversion reactions can be achieved which yields intermediate products. These intermediate products from such thermodynamically stable reactions can be easily used in the reforming processes. For $CO_2$ gas, the moving electrons separate the $CO_2$ molecules into carbon monoxide (CO) and oxygen (O) molecules. This is known as the collision, excitation, and dissociation reaction. More particularly, the CO molecules tend to recombine with the $O^-$ ions to form $CO_2$ molecules again. Alternatively, O— ions are in transition between O, $O_2$, and $O_3$ when interacting with other $O^-$, electrons, or $O^{2-}$ ions. For methane ($CH_4$) gas, it is dissociated and converted to radicals such as $CH_3$—, CH, and H. These electron radicals are unstable and tend to recombine to achieve a more stable state. After the formation of a more stable state, the collision with electrons continues, forming other radicals such as $C_2H_5^*$, $C_2H_3^*$. This recombination occurs to form large hydrocarbons such as $C_2H_6$, $C_3H_8$, $C_4H_{10}$, and $H_2$. For the above reasons, the convection currents formed by sub-system 222 as described in FIG. 2, FIG. 6, and FIG. 7 above alleviate the recombination problems.

Continuing with step 805, when two streams of $CO_2$ and $CH_4$ gases are passed through discharge gap 406 or plasma region, dissociation reactions to form electron radicals and recombination reactions to form long-chain hydrocarbons take place for the $CH_4$ molecules due to its $sp^3$ bonds and tetrahedral structure. However, with the presence of CO and O from the dissociation reactions of $CO_2$, the reaction turns to the formation of some new compounds containing oxidizing hydrocarbons being oxygenated by O such as methanol ($CH_3OH$), formaldehyde ($CH_2O$), acetaldehyde ($CH_3CHO$), etc.

At step 806, latent heat of condensation, exothermic and endothermic reactions, and convection currents scheme are used to achieve energy efficiency. Step 806 is realized by system 600 and 700 described above. If the arrangements as shown in FIG. 7 has a higher amount of thermal energy, then the substance releases thermal energy from its environment in order to make the phase change. If the new arrangement has a lower amount of thermal energy, the substance releases thermal energy to its environment, Latent heat of condensation is energy released when water vapor condenses to form liquid droplets. The latent heat of condensation is defined as the heat released when one mole of water condenses. The temperature does not change during this process, so heat released goes directly into changing the state of the substance. It is expressed as kg/mol or kJ/mol. The energy released in this process is called heat of condensation. The heat of condensation of water is about 2,260 kJ/kg, which is equal to 40.8 kJ/mol, a physical property of water. It is defined as the heat required to change one mole of liquid at its boiling point under standard atmospheric pressure. It is expressed as kg/mol or kJ/kg. When a material in liquid state is given energy, it changes its phase from liquid to vapor; the energy absorbed in this process is called heat of vaporization. The heat of vaporization of water is about 2,260 kJ/kg, which is equal to 40.8 kJ/mol. Since the endothermic reactions ($\Delta H>0$) in endothermic reactors 711 contact directly with exothermic reactions ($\Delta H<0$) of heating water in exothermic reactors 713, it does not require a lot of energy to provide thermal energy to endothermic reactors 711. Thus, energy is saved. In addition, the closed thermodynamic system formed between sub-system 222 and catalytic reforming reactor 701 create convection currents that cause plasma gases from DBD cold plasma unit 221 to enter first multiple inlets 702. This is an advantage of the present invention because plasma gases tend to recombine to form $CH_4$ and $CO_2$.

Finally, at step 807, catalytic reforming of cold plasma gases into syngas is performed. Step 807 is realized by catalytic reforming reaction unit 231. reforming reaction in the catalytic reforming reaction unit 231 from a temperature of 600° C. with a heating rate of 20° C./min to the transition temperature points, maintaining this reaction for 10 minutes before continuing the heating process to a higher temperature, which increases the conversion of $CO_2$-rich gas mixture into syngas where the conversion temperature is raised to 700° C., 750° C., 800° C., and 850° C., respectively.

The following process is intended to be illustrative of the present invention to teach one of ordinary skill in heart to make and use the invention and are not intended to limit the scope of the invention in any way.

The Process for Reforming Reaction Using DBD Cold Plasma

As shown in the FIG. 1 to FIG. 8, the process for performing the cold plasma preceding the reforming reactions in accordance with exemplary embodiments of the present invention is as follows. It should be noted that details and components are described and/or listed on the drawings to simplify and facilitate the understanding of the invention as illustrated on the FIGs provided.

The process of the present invention is performed on system 100 and system 200 consisting of two modules connected in series via tube connectors. In some embodiments, system 200 includes DBD cold plasma unit 211 with a dielectric barrier discharge configuration and a reforming reactor 231 arranged as shown in FIG. 2. More specifically, as shown in FIG. 2, system 200 includes a plasma emitter (not shown) configured to create and emit plasma. In order to ensure that the plasma flow is continuously generated and maintained, avoiding coke formation and perforation of the dielectric materials, the output power is designed to be adjustable through the following parameters: AC voltage of voltage power supply source 411 is adjusted to discharge voltage from 1-30 kV, plasma energy from 50-500 W, supply voltage from 10-200V and electric field frequency from 20-60 Hz. Discharge gap 406 or inner hollow space 503 provides effective space for the material gas to pass through the plasma region. It should be noted that based on these parameters and the information disclosed in the present disclosure including the FIGs, system 200 can be repeated by a person of ordinary skill without undue experiment.

In addition, other factors that can affect the plasma flow rate includes: the volume of the discharge gap 406 or inner hollow space 503, the thickness of the dielectric layer 405, and the material of electrode 403. More particularly, the volume of discharge area or inner hollow space 503 depends on the length of dielectric layer 405 and the discharge gap 406 between inner electrode 403 and dielectric layer 405. At a constant energy and discharge distance conditions, the decrease in the discharge length reduces the conversion rate due to the lower the contact time of the gas particles to achieve the activation energy to break the C—H bonds in $CH_4$ molecules and C—O in $CO_2$ molecules. The number of electrons per unit volume produced at a constant flow rate is called the electron density. The higher the electron density provides a wider range of charges to react with the gas molecules. Therefore, a high conversion rate is achieved. At a constant flow rate, the high discharge volume increases the retention time and favors the rapid activation of the reactive gases. Therefore, the longer the length of the reaction zone or outer mesh electrode 404, the longer the gas is exposed to the electric field, the higher the conversion. Here, the discharge length (or the length of dielectric tube 500) and launch distance as per the present invention are provided as 15 cm and 3 cm respectively to optimize $CH_4$ and $CO_2$ feed gas flow.

The materials of inner electrode 403 usually affect the electric field by conducting electricity. When the conductivity increases, the energy supplied to DBD cold plasma unit 221 increases, increasing the discharge electricity, thereby increasing the conversion of materials. In addition, the chemical resistance, thermal stability, ductility and cost are considered to match the configuration of DBD cold plasma unit 221. According the present invention, stainless steel material is chosen for outer mesh electrode 404. Furthermore, DBD cold plasma unit 221 with dielectric barrier discharge configuration may also include other auxiliary components such as current meters, flow control valves (not shown).

System 600 as shown in FIG. 6 includes:
Reforming reactor core 616 where temperature can reach to 900° C.
Cylindrical quartz catalyst material 617 is in form of a tube with 8 mm inner diameter, heated in insulator section 613, and temperature controlled by heaters 614.
Gas input stage 110 or 210 include $N_2$, $H_2$ carrier gas lines, air, $CH_4$, $CO_2$ reaction gas and reaction gas flow controller, steam supplying micro pump.

A heat exchanger to cool, liquefy, and separate water before collecting the gas products for composition analysis. It should be noted again that based on these parameters and disclosures including the FIGs, system 200 can be repeated by a person of ordinary skill in the art without undue experiment. Therefore, detail description as in a production manual is not necessary.

EXAMPLES CARRYING OUT THE PRESENT INVENTION

Hereafter, method 800 and system 200, system 600, and system 700 of the present invention are further described and illustrated through examples illustrating the invention without restricting the invention in anyway.

Example 1. Heat Transfer Efficiency when Using Powder Catalyst and Monolith/Foam Catalyst in Reforming Reactor In this example, the conversion of natural gas to syngas for fuel production at step 807 is via reforming with highly endothermic, high-temperature reactions. In case of steam reforming, the energy was 206 kJ/mol. In case of dry reforming, the energy released was 260.5 kJ/mol. A monolith/foam Ni-based reforming catalyst is used in catalyst materials 617 or 712 instead of the traditional nickel catalyst due to the superior properties of the active phase carrier framework. Experiment to investigate the temperature distribution in catalyst materials 617 or 712 at reforming conditions to examine the effect of the endothermic process of the $CH_4/CO_2$ raw material reforming reaction.

Catalyst materials 617 or 712 was 20% wt active phase (Ni/Mg-Al)/cordierite monolith framework ($\phi$>=10 mm, L=30 mm); catalyst Ni/Mg—Al microspheres (180-300 μm);
- Input natural gases from gas input stage 110 or 210: $CH_4/CO_2/H_2O$ ratio 2.5/1/2, the flow rate was 100 ml/min;
- Arrange temperature recording points in catalyst material 617 or 712: Arrange 03 heat detectors at 03 positions (outer wall. ½ radius r and center of the catalyst layer);
- Record the results at eight positions according to the elevation of the catalyst material 617 or 712 (T1-T8), The feed conversions of the reforming reaction on the monolith and powder-frame nickel catalyst materials 617 or 712 are shown in Table 3 below.

TABLE 3

| Parameters | Ni-Catalyst in Powder | Ni-Catalyst in Monolith |
| --- | --- | --- |
| Operating Parameters | | |
| Reaction Temperature (° C.) | 750 | 750 |
| GHSV ($h^{-1}$) | 35,000 | 35,000 |
| Catalyst | Ni/Mg—Al (180-300 μm); 0.1 (g) | Ni/Mg—Al (0.1 g) covering Cordierite Monolith |
| Catalyst Arrangement | Mixed with Inert Particles 300-500 μm, dimension of bed $\phi$12 mm × L 30 mm | Dimension of catalyst monolith $\phi$12 mm × L 30 mm |
| Input Gases ($CH_4/CO_2/H_2O$) | 2.5/1/2 | 2.5/1/2 |
| $X_{CH4}$ (% wt) | 79.21 | 83.3 |
| $X_{CO2}$ (% wt) | 65.3 | 72.4 |
| Ratio $H_2$/CO | 2.2 | 2.05 |

Thus, with the same amount of catalyst material used in 617 or 712, the structural framework material (monolith vs. foam) proved to have a much better heat transfer efficiency, thereby improving the conversion of $CO_2$ and $CH_4$ in the reforming reactions.

Figure 9:
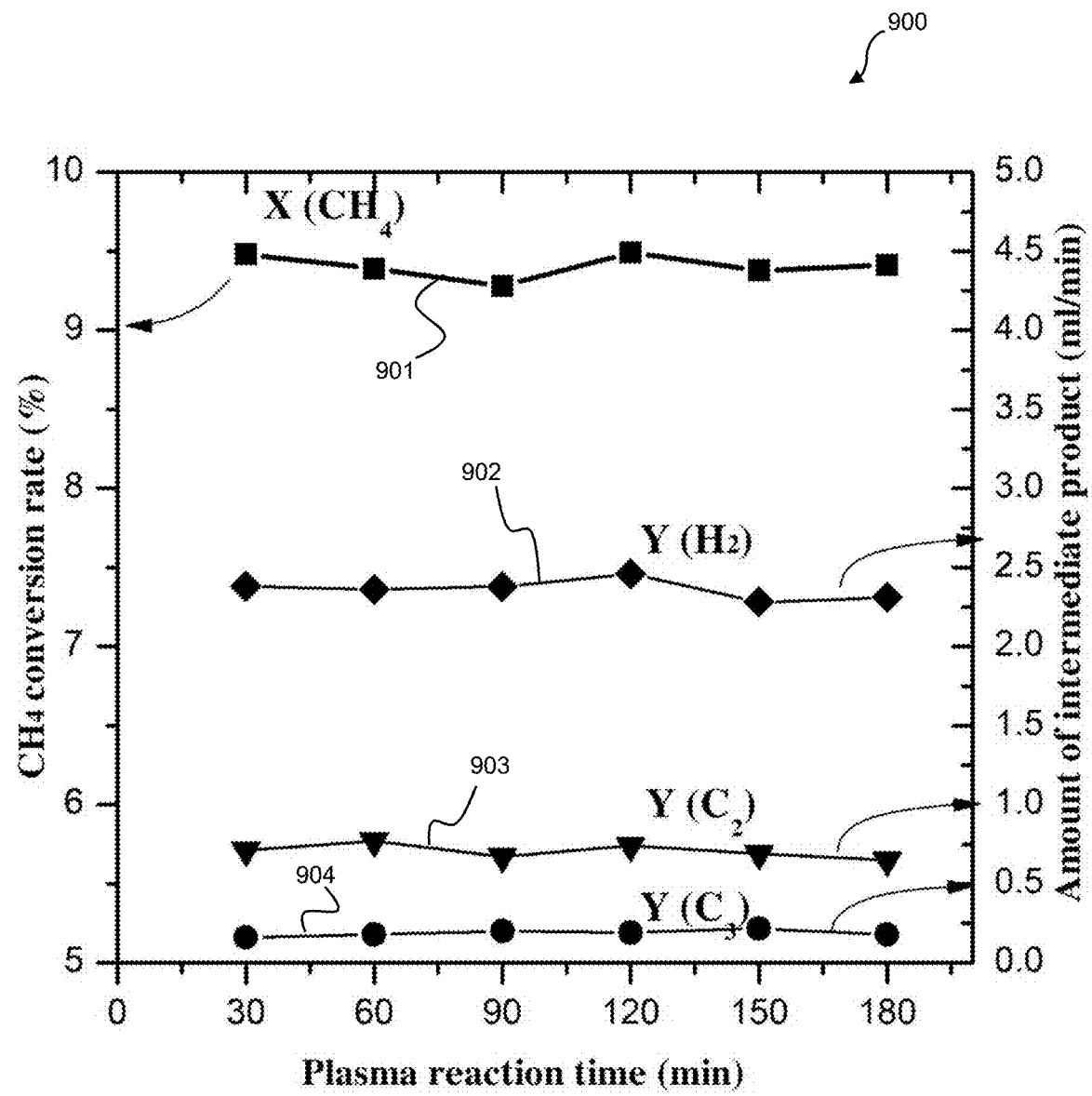
FIG. 9 is a graph representing the $CH_4$ conversion rate (%) vs plasma reaction time in accordance with an exemplary embodiment of the present invention.

Example 2: Evaluation of the Effect of the Plasma System on the Reforming Inlet Stability of the Feed Gas Stream Example 2-1: For $CH_4$ Gas With the configuration set up as described in system 200, system 600, and system 700, increasing the plasma area length or increasing the plasma projection power both faced some limitations due to the phenomenon of coke depositing with electric arc appearing (plasma power >25 W). Through parameter influence surveys and equipment responsiveness assessment, applying CH, gas treatment on the DBD cold plasma stage 220 was selected with the following parameters:
- Electrode core 403 and stainless steel housing for cold plasma reactor core 400A, high voltage 10 kV, 60 Hz was set for voltage power supply source 411.
- Dielectric material 405 was Pyrex, thickness $\delta$=1.5 mm. launch space 1-3 mm;
- Stable discharge power of 20 W, working time t=3.5 s, corresponding to length L=9 cm:

The $CH_4$ plasma efficiency over irradiation time (P=20 W, Uh=10 kV, residence time t=3.5 s, $CH_4/N_2$=1/1) is shown in FIG. 9.

Referring now to FIG. 9, through the parameter influence surveys and equipment response assessment, $CH_4$ gas treatment application on the DBD plasma system was selected with the following parameters:
- Core electrode and stainless steel housing, high voltage 10 kV, 60 Hz.
- Pyrite dielectric, thickness $\delta$=1.5 mm. launch space 1-3 mm;
- Stable discharge power of 20 W, operation time t=3.5 s, corresponding to length L=9 cm;
- Raw materials $CO_2/N_2$=1/1.

A graph 900 of $CH_4$, $H_2$, $C_2$, and $C_3$ conversion rates and the amount of intermediate products vs. plasma reaction time in minute is illustrated. A curve $X(CH_4)$ 901 of the $CH_4$ conversion rate reaches a stable conversion rate ~9.5%. Curve 901 also indicates the intermediate product yield is stable at 4.5 mL/min. A curve Y(H2) 902 of the of the $H_2$ conversion rate reaches a stable conversion rate ~7.5%. Curve 902 also indicates the intermediate product yield remained stable at 2.5 ml/min $H_2$. A curve $Y(C_2)$ 903 of the of the $C_2$ conversion rate reaches a stable conversion rate ~5.7%. Curve 903 also indicates the intermediate product yield remained stable at 1 mL/min. A curve $Y(C_3)$ 904 of the of the $C_3$ conversion rate reaches a stable conversion rate ~5.2%. Curve 904 also indicates the intermediate product yield remained stable at 0.5 mL/min.

Example 2-2: For $CO_2$

Figure 10:
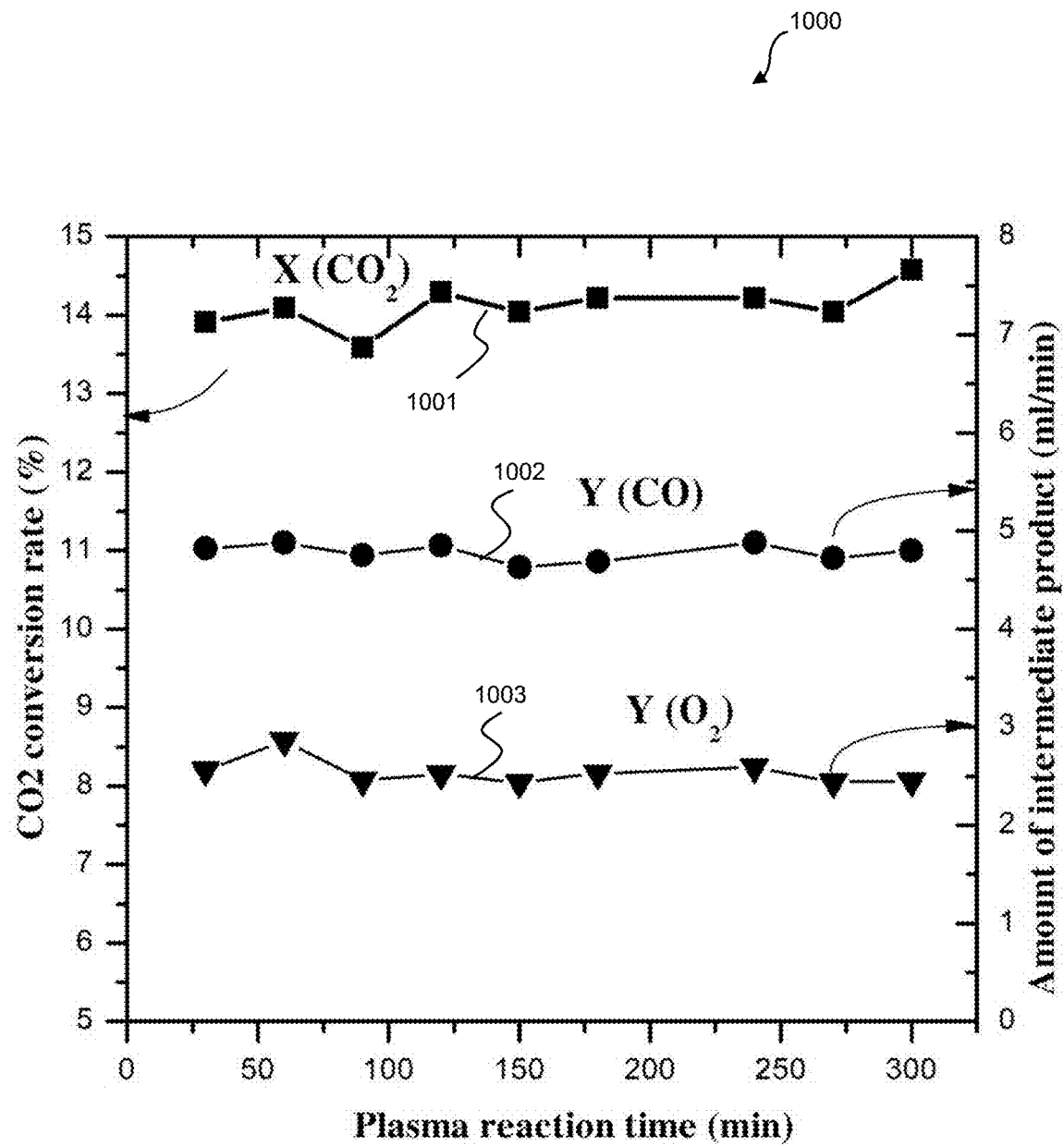
FIG. 10 is a graph representing the $CO_2$ conversion rate (%) vs plasma reaction time in accordance with an exemplary embodiment of the present invention.

Next referring to FIG. 10, a graph 1000 of $O_2$, CO, and $O_2$ conversion rates in % and the amount of intermediate product versus plasma reaction time in minute is illustrated. Through the parameter influence surveys and equipment response assessment, $CH_4$ gas treatment application on the DBID plasma system was selected with the following parameters:
- Core electrode and stainless steel housing, high voltage 10 kV, 60 Hz.
- Pyrite dielectric, thickness $\delta$=1.5 mm. launch space 1-3 mm;
- Stable discharge power of 20 W, operation time t=3.5 s, corresponding to length L=9 cm;
- Raw materials $CO_2/N_2$=1/1

The $CO_2$ plasma efficiency over irradiation time (P=20 W, Uh=10 kV, residence time t=3.5 s, $CO_2/N_2$=1/1) is shown in FIG. 10.

As shown in FIG. 10, a curve 1001 of $CO_2$ conversion and $CO_2$ dissociation of intermediate product yield stabilized at X~14% and the intermediate product is stabilized at 4.5 mL/min are shown respectively. A graph 1002 Y(CO) shows that CO gas has the conversion rate at 11% and the intermediate product remained stable at 5 ml/min. A curve 1003 of $O_2$ conversion rate and amount of intermediate product shows that $O_2$ conversion rate is 8.5% and the amount of intermediate product is stabilized at 2.5 ml/min continuously for 6 hours of continuing treatment.

Example 3. Effect of Plasma Generating Power on Reforming Efficiency

Input power is one of the important factors to determine the ability to soften compounds. This example investigates and evaluates the influence of the plasma projection power parameter on the separation of $CH_4$ material made in the $CH_4/N_2$ component at the volume ratio 1/1. Projection power is adjusted through voltage variation (U) adjustment at constant frequency. Increasing the plasma projection power increased the $CH_4$ conversion, increasing $XCH_4$ from 4.2 to 14.2% when processing through the plasma with a power of 10 to 25 W at the condition of retention time RT=2.5 s (length electrode L=6 cm, flow Q=60 ml/min), core high voltage HV=10 KV. The process of forming new molecules through collisions with electrons in the dielectric discharge region, so when the electrical power increases, the energy level and charge density released from the device increase, causing for faster collision and formation of new compounds. Therefore, the $CH_4$ conversion efficiency is enhanced when treated in the high-powered plasma region.

Figure 11:
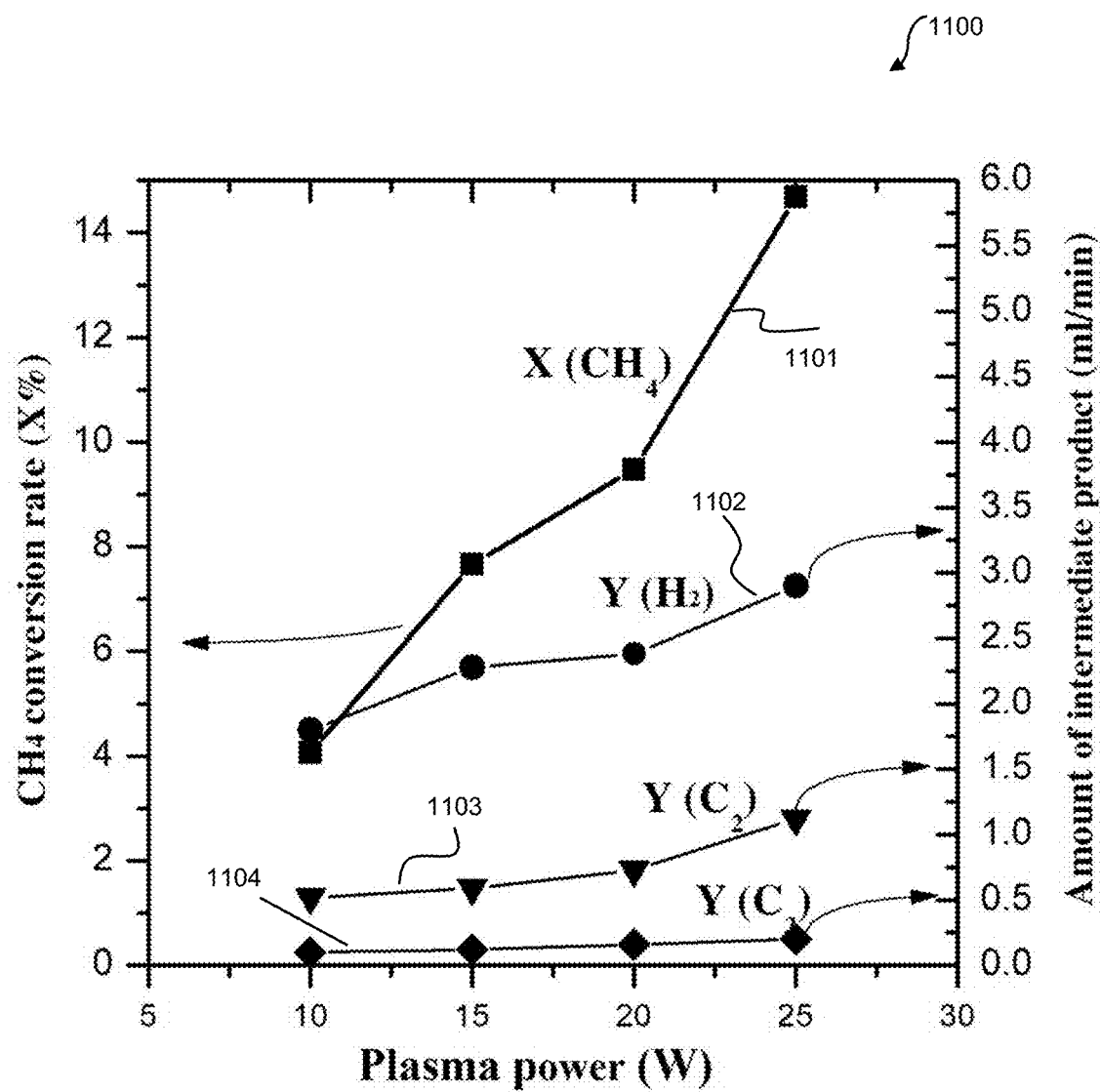
FIG. 11 is a graph representing the $CH_4$ conversion rate (%) vs plasma powers in Watts in accordance with an exemplary embodiment of the present invention.

Next, referring to FIG. 11, a graph of $OH_4$, $H_2$, hydrocarbons $C_2$, and $C_3$ conversion rates versus plasma power in Watts is shown. A curve 1101 of $CH_4$ conversion and intermediate products Y shows a sharply increasing curve from 4% to more than 14%. This is due to the upper limit of dielectric barrier discharge (DBD) cold plasma device 300 or 400 when operating at high power, specifically in plasma conditions greater than 25 W, the arc phenomenon is observed with yellow rays in the projection area along with other activities. The plasma action is unstable, with a black smear clinging to the dielectric wall, and causes perforation of the dielectric material when operating at this power value. This phenomenon of coke formation on the dielectric is also recognized by previous research that has shown that increasing the heat capacity helps to increase the amount of $CH_4$ converted into other compounds also promotes the direct dissociation of $CH_4$ into the clinging coke in the plasma region, affecting the device. A graph 1102 of hydrogen ($H_2$) conversion rate (%) versus plasma power shows that the conversion to hydrogen is slightly increased with respect to plasma power, from 1.5 mL/min to 3.4 mL/min. A graph of other hydrocarbon $C_2$ 1103 such as ethylene $C_2H_4$ and acetylene $C_2H_2$ is more constant against the increase in the plasma power, from 0.5 to 1 mL/min. A graph of hydrocarbon $C_3$ 1104 is almost a constant at 0.3-0.5 mL/min.

Example 4. Effect of Cold Plasma Integration of $CO_2$ into Syngas Reforming Reaction Effect of composition and ratio of intermediate components on the reforming process carried out on a continuous flow reactor at a temperature of 650° C., a GHSV of 30,000 h−1 and a ratio of $CH_4/CO_2/H_2O$ is kept fixed at 2.5/1/2 with the step of applying cold plasma pretreatment to the $CO_2/N_2$ mixture (1/1), the treatment gas flow through the plasma is 60 ml/min. The composition of the intermediate compounds (CO and $O_2$) generated by the $CO_2$ plasma pretreatment can be adjusted by changing the power parameters and the retention time.

The ratio of CO and $O_2$ intermediate components after the $CO_2$ plasma and after the reforming mix at the discharge powers P=10, 15, 20 W is evaluated in Table 3. As the plasma discharge power increases, the interaction efficiency increases with the dilution. $CO_2$ conversion increased (7.9 to 14.2% kl), along with increased intermediate component yield in the gas stream after plasma treatment. The proportion of intermediate components in the mixture increased with increasing plasma irradiation efficiency from 0.6-1.1% for $O_2$ and 1-2.1% for CO.

TABLE 4

| Observed Parameters | | $PCO_2$-10 w | $PCO_2$-15 w | $PCO_2$-20 w |
|---|---|---|---|---|
| Plasma $CO_2$:$N_2$ 1/1 | | | 60 ml/min | |
| Conversion Rate $CO_2$ ($X_{plasma}$) | | 7.9 | 10.54 | 14.22 |
| Intermediates | $CO_2$ | 27 | 26 | 25 |
| After Plama | CO | 2.74 | 3.63 | 4.82 |
| (ml/min) | $O_2$ | 1.38 | 1.64 | 2.49 |
| | $N_2$ | 31 | 31 | 30.6 |
| Mixture reforming | | 75 ml $CH_4$/45 ml $N_2$/60 ml/$H_2O$ | | |
| Ratio of | CO | 1.14 | 1.52 | 2.02 |
| Intermediate | $O_2$ | 0.57 | 0.68 | 1.03 |
| After Mixture Reforming (% mol) | | | | |

It can be seen that the reforming efficiency is significantly improved when $CO_2$ pretreatment is applied. The conversion of $CH_4$, $CO_2$ increased when $CO_2$ plasma was applied, the syngas product yield was higher than the case where no treatment was applied. On the other hand, increasing the irradiance power increases the reforming efficiency, specifically the power increases by 10-20 W, the $CH_4$ conversion by 9% (30 to 39%) and the $CO_2$ conversion by 19 to 21%. This result can be explained as follows:

- The product line after plasma contains active components such as remaining electrons, raw material molecules already excited in the electric field, etc. This is an energy-carrying component that effectively supports bond breaking in the following reforming reaction;
- Compounds CO and $O_2$ are generated, which are oxidizing agents in the reforming process. Because the bond breaking energy in the $O_2$ molecule (146 kJ/mol) is much lower than that of $CO_2$ and $H_2O$. CH4 reacts more readily with $O_2$ than other materials.

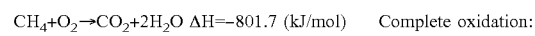

$CH_4+O_2 \rightarrow CO_2+2H_2O$ ΔH=−801.7 (kJ/mol)  Complete oxidation:

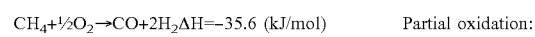

$CH_4+½O_2 \rightarrow CO+2H_2$ ΔH=−35.6 (kJ/mol)  Partial oxidation:

In it, methane is partially oxidized to CO and $H_2$ (synthetic gas) favorably at a right temperature between about 700° C. and 900° C. In the investigated temperature range (650° C.), complete oxygen reaction occurs preferentially with 100% $O_2$ conversion. It is noteworthy that the temperature of the thermal combustion reaction is quite large (ΔH=−801.7 (kJ/mol)), this heat creates catalytic regions with higher temperatures than the furnace's feed heat. Heat has the effect of promoting the conversion of $CH_4$ and $CO_2$ materials (self-heating effect).

Figure 12:
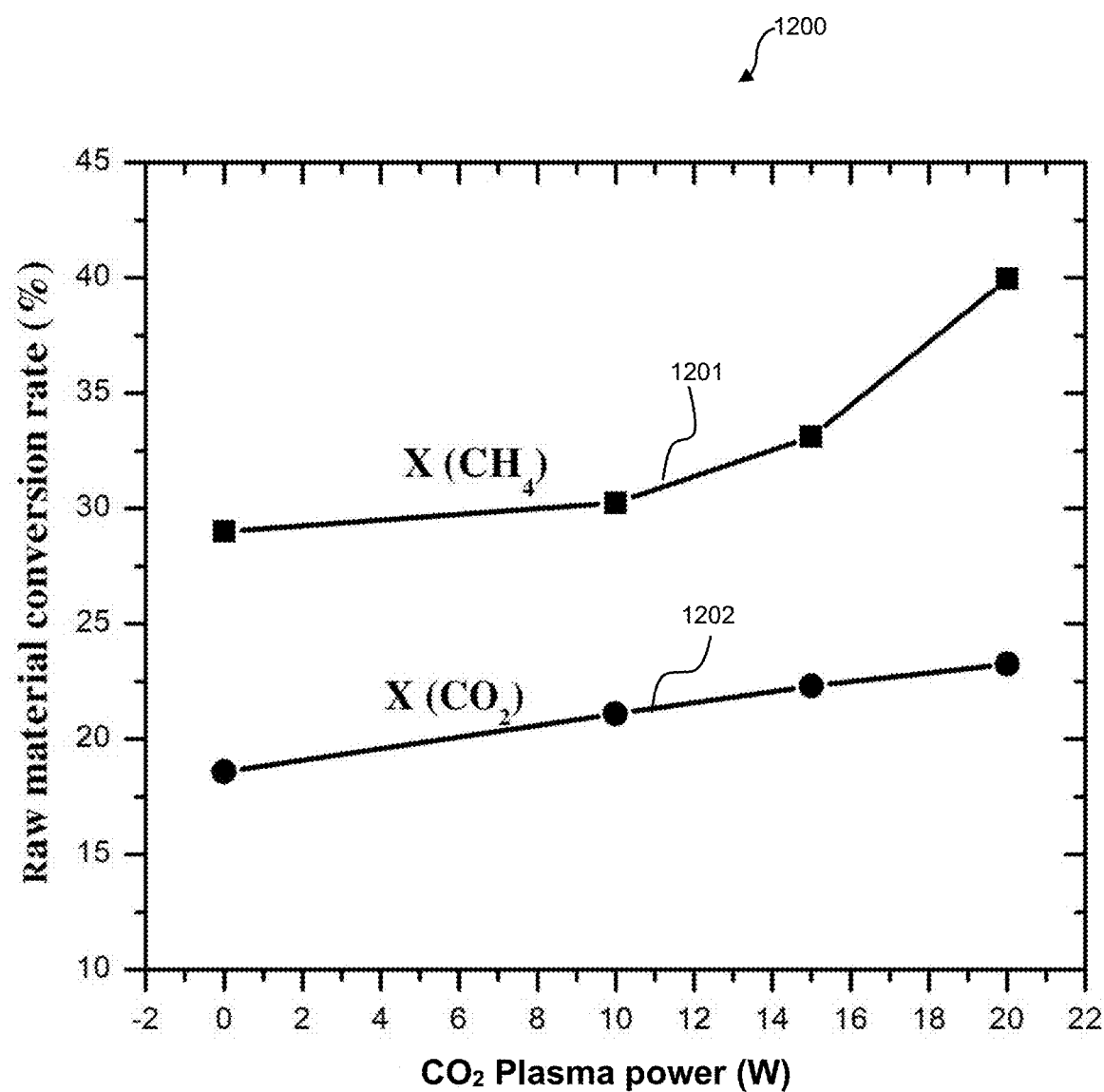
FIG. 12 is a graph representing raw material conversion rate (%) vs $CO_2$ plasma powers from 0-20 Watts in accordance with an exemplary embodiment of the present invention.

Now referring to FIG. 12, a graph 1200 comparing the amount of $CH_4$ and $CO_2$ participating in the reaction is proportional to the amount of $O_2$ in the reagent is illustrated. As shown in a curve 1201, the conversion of $CH_4$ increases as the amount of $O_2$ participating in the reaction increases. Compared with $CH_4$, a curve 1202 of the conversion of $CO_2$ increased only slightly when the amount of $O_2$ was increased because the amount of $CO_2$ completely oxidized $CH_4$ reacted product added to the reaction mixture, indirectly making no significant change in $CO_2$ conversion.

Figure 13:
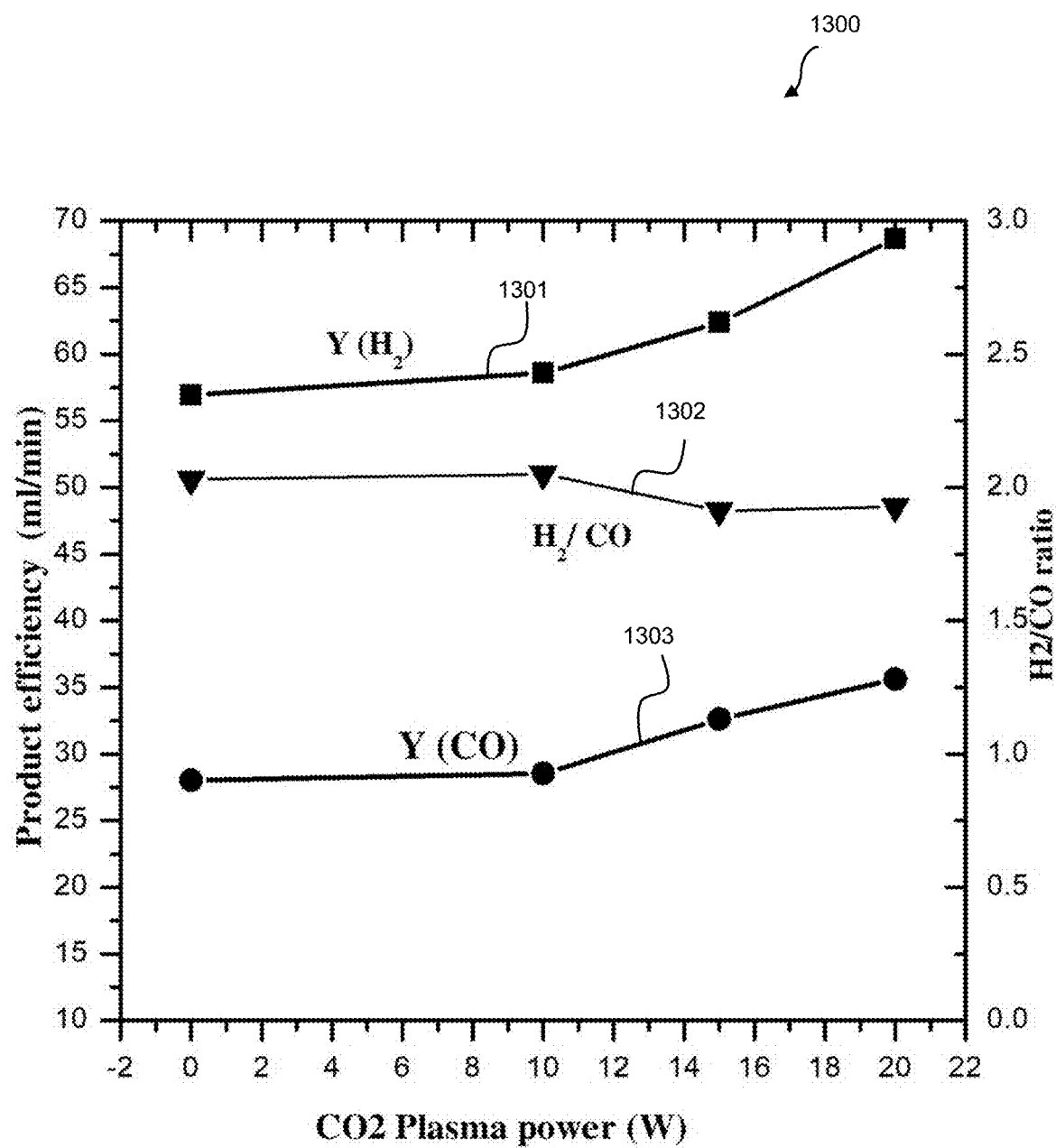
FIG. 13 is a graph representing product efficiency (mL/min) vs $CO_2$ plasma powers from 0-20 Watts in accordance with an exemplary embodiment of the present invention.

Next referring to FIG. 13, a graph 1300 of $H_2$, $H_2/CO$, and CO yields versus plasma power is illustrated. A graph 1301 shows that the presence of the $O_2$ intermediate has a significant influence on the $H_2$ yield as well as the $H_2/CO$ ratio at 650° C. as shown in a curve 1302. Increasing $O_2$ content leads to an increase in $H_2$ and CO efficiency. Curve 1302 shows that the ratio of $H_2/CO$ tends to decrease slightly (2.05 to 1.95) when increasing $O_2$ content due to the competition between steam reforming reaction for ratio $H_2/CO=3$ and ratio $H_2/CO=1$ obtained from the dry reforming reaction, which indicates that dry reforming begins to occur more strongly as the heat supplied from the combustion of methane increases. A curve 1303 shows that the syngas production efficiency ($H_2$+CO) increased by nearly 20% when applying plasma at 20 W power, from 84 ml/min to nearly 103 mil/min.

The technical efficiency on the $CO_2$ plasma pretreatment model is further examined in detail by comparing the product structure with the reforming conversion without plasma pretreatment at higher temperatures.

Figure 14:
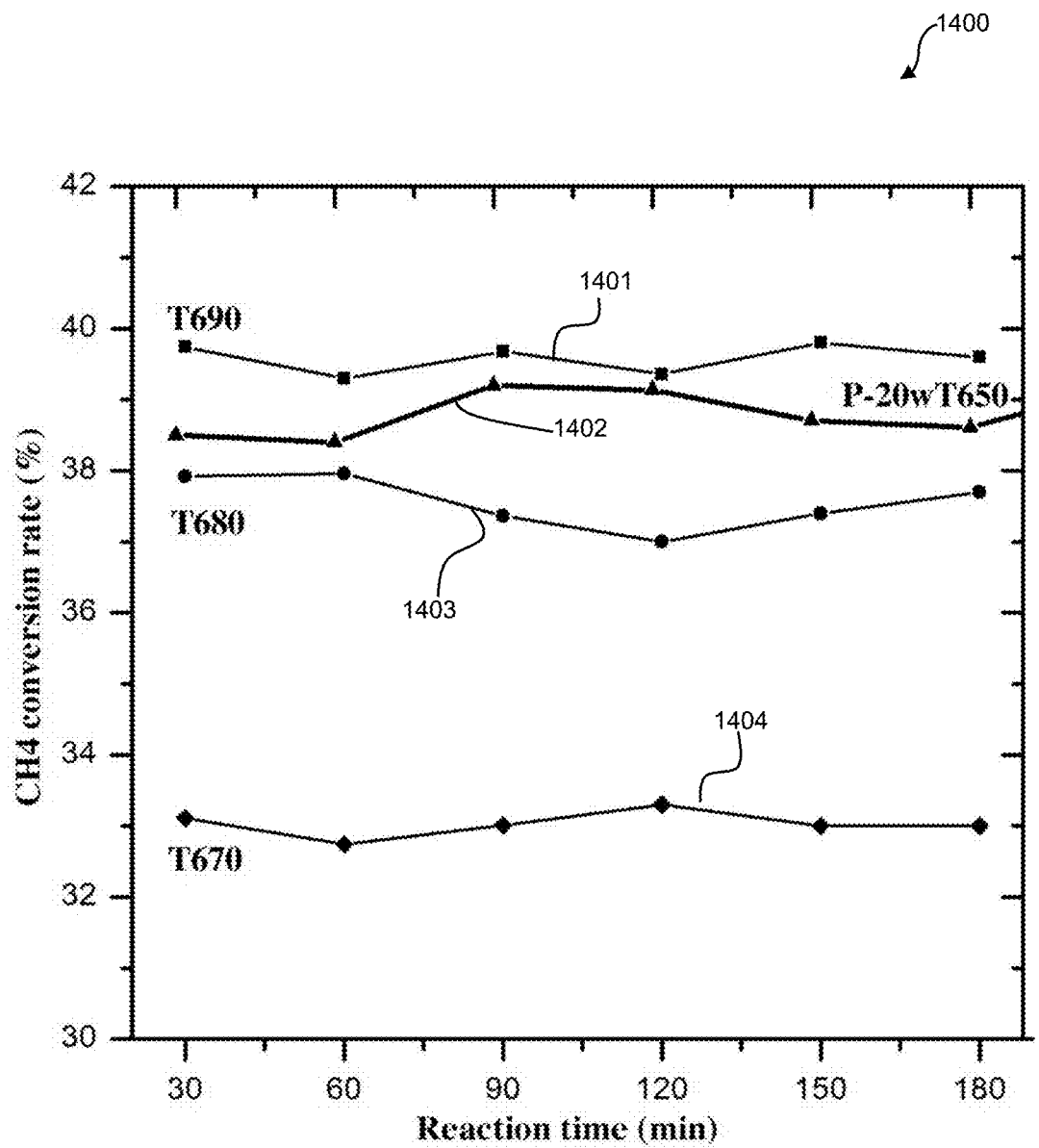
FIG. 14 is a graph representing $CH_4$ conversion rate (%) vs reaction time in minutes in accordance with an exemplary embodiment of the present invention.

Referring to FIG. 14, a graph 1400 of $CH_4$ conversion rate versus different temperatures at 650° C. with $CO_2$ plasma applied at 20 W power compared to traditional reforming without plasma at 670° C., 680° C. and 690° C. is illustrated. A curve 1401 shows a constant conversion at about 40%. A curve 1402 shows the rate of $CH_4$ conversion at 39% with plasma treatment at 650° C., A curve 1403 shows $CH_4$ conversion at 38% without plasma pretreatment at 680° C. A curve 1404 shows $CH_4$ conversion at 33% without plasma pretreatment at 670° C. Thus, A curve 1404 FIG. 15, and FIG. 16 show the conversion efficiency, the product structure of the reforming case at 650° C. with $CO_2$ plasma applied at 20 W power and traditional reforming without plasma at 670° C., 680° C. and 690° C.

Figure 15:
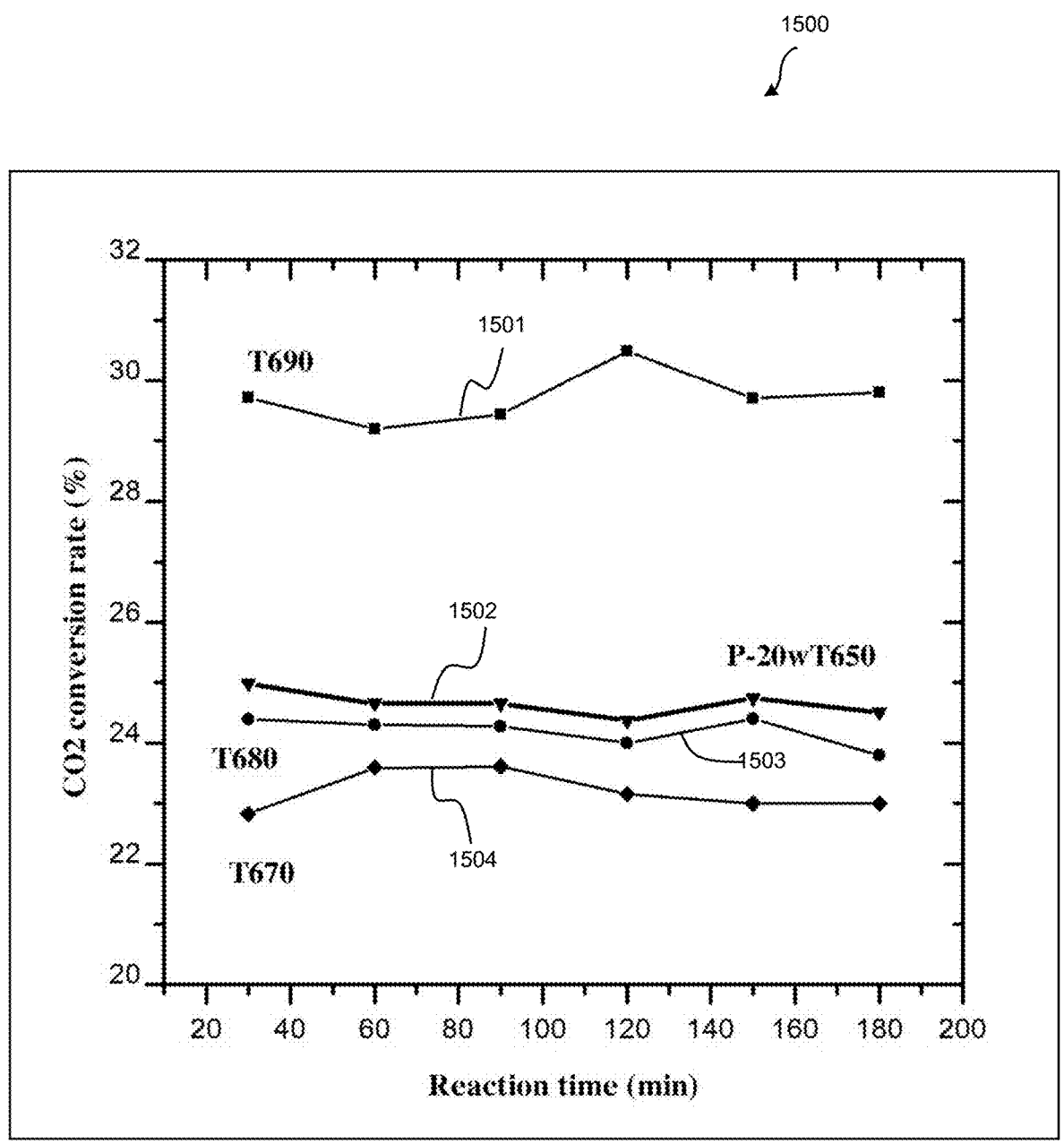
FIG. 15 is a graph representing $CO_2$ conversion rate (%) vs reaction time in minutes in accordance with an exemplary embodiment of the present invention.

Referring to FIG. 15, a graph 1500 of $CO_2$ conversion rate versus different temperatures at 650° C. with $CO_2$ plasma treatment applied at 20 W power compared to traditional reforming without plasma at 670° C., 680° C. and 690° C. is illustrated. A curve 1501 shows a constant conversion at about 30%. A curve 1502 shows the rate of $CO_2$ conversion at 25% with plasma treatment at 650° C. A curve 1503 shows $CO_2$ conversion at 24% without plasma pretreatment at 680° C. A curve 1504 shows $CO_2$ conversion at 23% without plasma pretreatment at 670° C.

Figure 16:
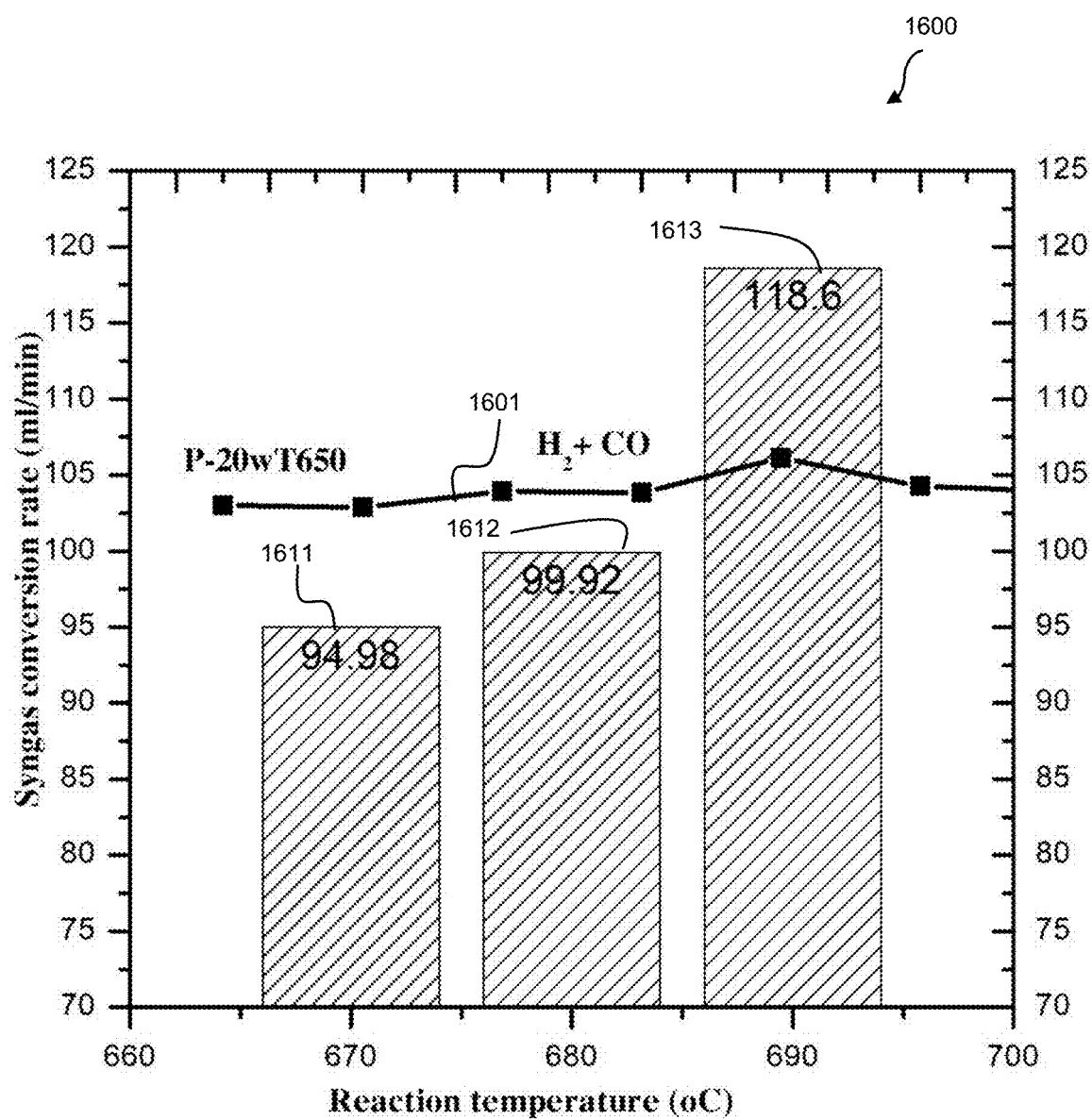
FIG. 16 is a bar chart for syngas conversion rate (mL/min) against the reaction temperature (° C.) in accordance with an exemplary embodiment of the present invention.

Referring next to FIG. 16, a graph 1500 of syngas conversion rate in mL/min versus reaction temperatures at 650° C. with plasma treatment, 670° C. to 690° C. without plasma treatments is illustrated. A graph 1601 shows a constant syngas conversion at 104 mL/min of plasma pretreatment at 650° C. A bar graph 1611 of syngas conversion of 94.98 mL/min at 670° C. without plasma pretreatment. A bar graph 1612 of syngas conversion of 99.92 mL/min at 680° C. A bar graph of 1613 of syngas conversion of 118.6 mL/min at 690° C.

For $CH_4$: In case of reforming —$CO_2$ plasma at 650° C., the $CH_4$ conversion is equivalent to that of $XCH_4$ without plasma at 690° C., the plasma effectively reduces the temperature by 40° C.;

For $CO_2$: Plasma effectively reduces temperature by 30° C., with $CO_2$ conversion using plasma equivalent to $XCO_2$ without plasma at 680° C.

Syngas products: Plasma $CO_2$ gives syngas efficiency 105 ml/min higher than syngas production efficiency (100 ml/min) when plasma is not applied at 680° C.

Figure 17:
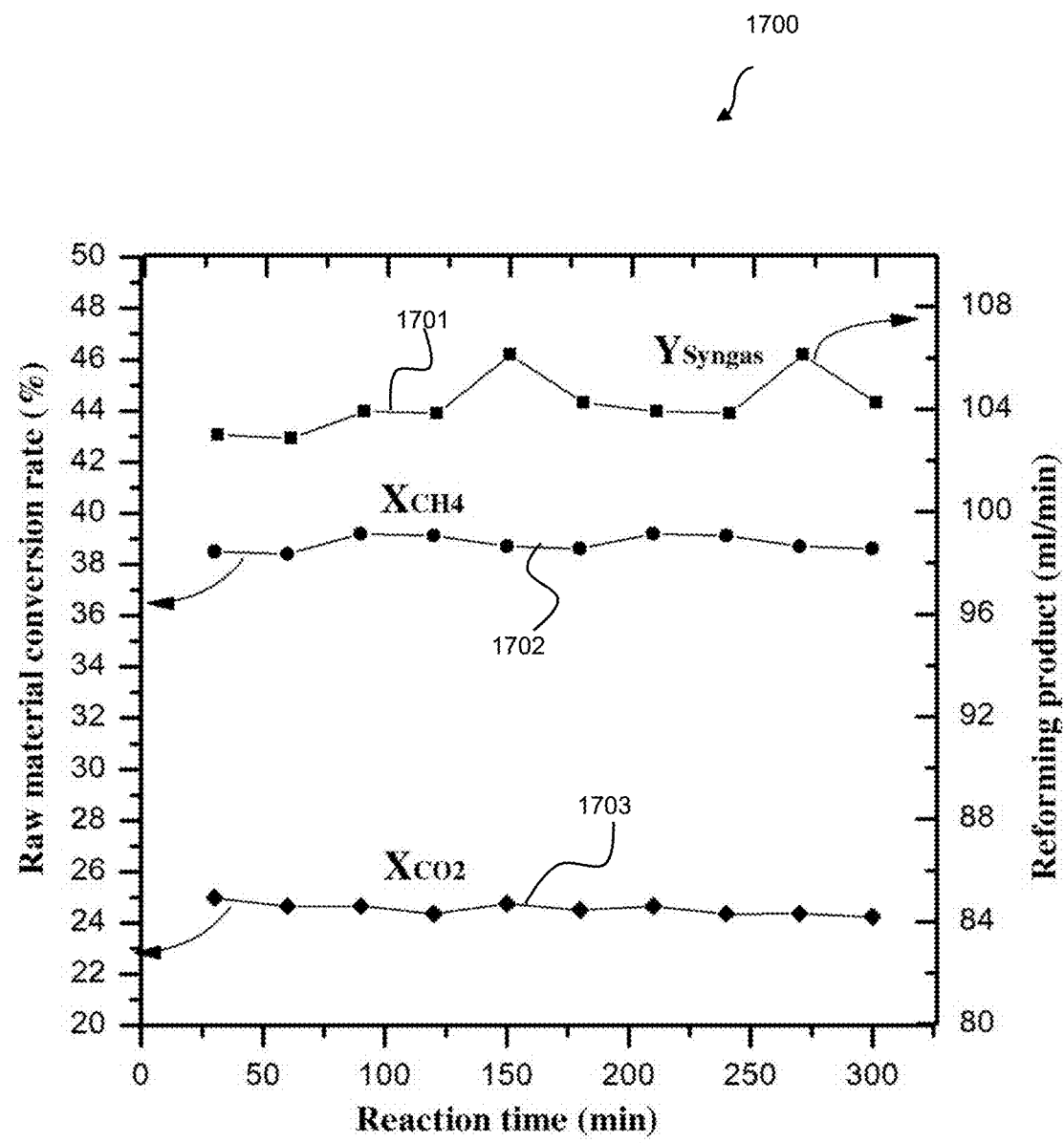
FIG. 17 is a graph representing raw material conversion rate (%) against the reaction time (minutes) in accordance with an exemplary embodiment of the present invention.

Next referring to FIG. 17, a graph 1700 expressing the conversion rate of $CO_2$ and $CH_4$-rich natural gases versus output syngas is illustrated. A curve 1701 showing reformation of syngas to be about 106 mL/min. A curve 1702 showing the conversion rate of $CH_4$ gas to be about 37%. A curve 1703 shows that conversion rate of CO2 gas to be about 25%. In conclusion, the catalytic stability (activity) when operating in the plasma pretreated catalyst environment is also considered and evaluated through the survey of activity over time, finding that the catalyst works stably with high plasma energy. Curves 1701-1703 show that conversion of raw materials (1702 and 1703) and formed syngas products (1701) was maintained constant after 5 hours of survey as shown in FIG. 17.

Example 5: Economic Efficiency of Applying Cold Plasma in the Reforming Process at the Laboratory Scale Method: Record the power consumption in the condition (reforming with integrated plasma in the condition: 20 W, 650° C.) and traditional reforming (temperature condition: 680° C.). The conditions are taken from the results of example 2. The electricity price is temporarily calculated at VND 1,820/kW. The calculated parameters and results are shown in Table 5.

TABLE 5

| | Reforming Using plasma | Traditional Reforming Without Plasma |
|---|---|---|
| Input Data | $CH_4/CO_2/N_2/H_2O$ = 2.5/1/2.5/2.0, Q = 240 ml/Min. | |
| Reaction Conditions | Heating 0-650° C. in one hour Plasma operated at 69 V, 20 W in three hours Reforming Reaction at 650° C. in 3 hours | Heating 0-680° C. in one hour Reforming Reaction at 680° C. in 3 hgours |
| Power Consumption (KW) after 4 h | 1.4 | 1.8 |
| Electrical Energy Consumption 1 h (KW/h) | 0.35 | 0.45 |
| Sum (VNĐ) | 637 | 819 |

Thus, it can be seen that the energy cost is reduced by 182 (or 23%) VND per hour of syngas production.

Example 5. Effect of Reforming Catalyst Carried on Monolith Carrier to Reforming Reaction In this example, a powder reforming catalyst with the formula $10Ni_2Co/Mg_{0.5}AlO_x$ with a Ni content of 10% wt %, Co 2% wt and a Mg/Al ratio of 0.5 is carried onto the substrate bearing monolith with a content of 20% wt.

The powder catalyst was synthesized by co-precipitation method by simultaneously dripping the nitrate salts $Ni(NO_3)_2.6H_2O$, $Co(NO_3)_2.6H_2O$, $Mg(NO_3)_2.6H_2O$ and $Al(NO_3)_3.9H_2O$. NaOH solution was used as the co-precipitating agent. Dissolve the nitrate salts in distilled water. Then, two solutions of salt and NaOH were added simultaneously to the $Na_2CO_3$ solution with a burette, stirring at 360 rpm. The pH value was adjusted at 8-12 with NaOH solution. The obtained suspension was continuously stirred and aged overnight. After that, the mixture was cooled to room temperature, filtered and washed several times with distilled water until neutral pH, and dried to give different hydrotalcite structures. These catalyst samples will then be calcined in a furnace at 800° C. for 6 hours Next, the monolith cordierite rod was machined into a cylindrical shape with dimensions ϕ12 mm x L 30 mm and the frame surface treated by sonicating the monolith frames in 90% ethanol solution for 30 minutes at 60° C. and dried overnight. at 110° C. to clean the structural frame surface.

The $10Ni_2Co/Mg0.5AlOx$ catalyst obtained after the calcination process was ground to a fine grain size of 2-5 μm and dispersed into distilled water with a solid/liquid ratio (30 g/liter, monolith).). The mixture was converted into a "milk" colloidal stabilizer by ultrasound for 1 hour at pH 8. Immerse the monolith framework in the catalyst solution axially, fixed in the solution by a system of baskets positioned at temperature 30° C., 5 minutes. Blow-dry to remove the loose part from the surface of the structural frame with a stream of hot air, dry at 110° C., for 15 minutes. Perform the impregnation and drying process repeated 20 times with the immersion time of 1 minute until the active phase mass of 20% wt on the monolith rod is reached. Finally, the catalyst was subjected to catalytic heat treatment at a temperature of 550° C., heating rate of 2° C./min for 3 hours.

Catalyst activity was evaluated through a BRM (Bi-reforming) reaction carried out in a gas phase continuous flow reaction system and a stationary catalyst bed under conditions of high temperature and atmospheric pressure. The catalyst was reduced immediately in the reaction tube by a stream of $H_2$ at 800° C. for 1 hour before conducting reforming reactions at 800° C. Raw material ratio $CH_4/CO_2/H_2O/N_2$=1:0.4:0.8:1 ($CH_4$=75 mL/min, $N_2$=75 mL/min, $CO_2$=30 mL/min, $H_2O$=60 mL/min). The reaction products (including CO, $H_2$, $H_2O$, $CH_4$, $CO_2$ and $N_2$) are separated from water before sampling the product stream for analysis by gas chromatograph.

The results of the above monolith framework (20% wt) catalytic activity at 800° C. are shown in Table 6 below.

TABLE 6

|  | Catalyst monolith 20% |
| --- | --- |
| Conversion Rate $CH_4$ (%) | 91.84 |
| Conversion Rate $CO_2$ (%) | 85.05 |
| Ratio $H_2/CO$ | 2.02 |
| Carbon Balance | 90.98 |

Figure 18:
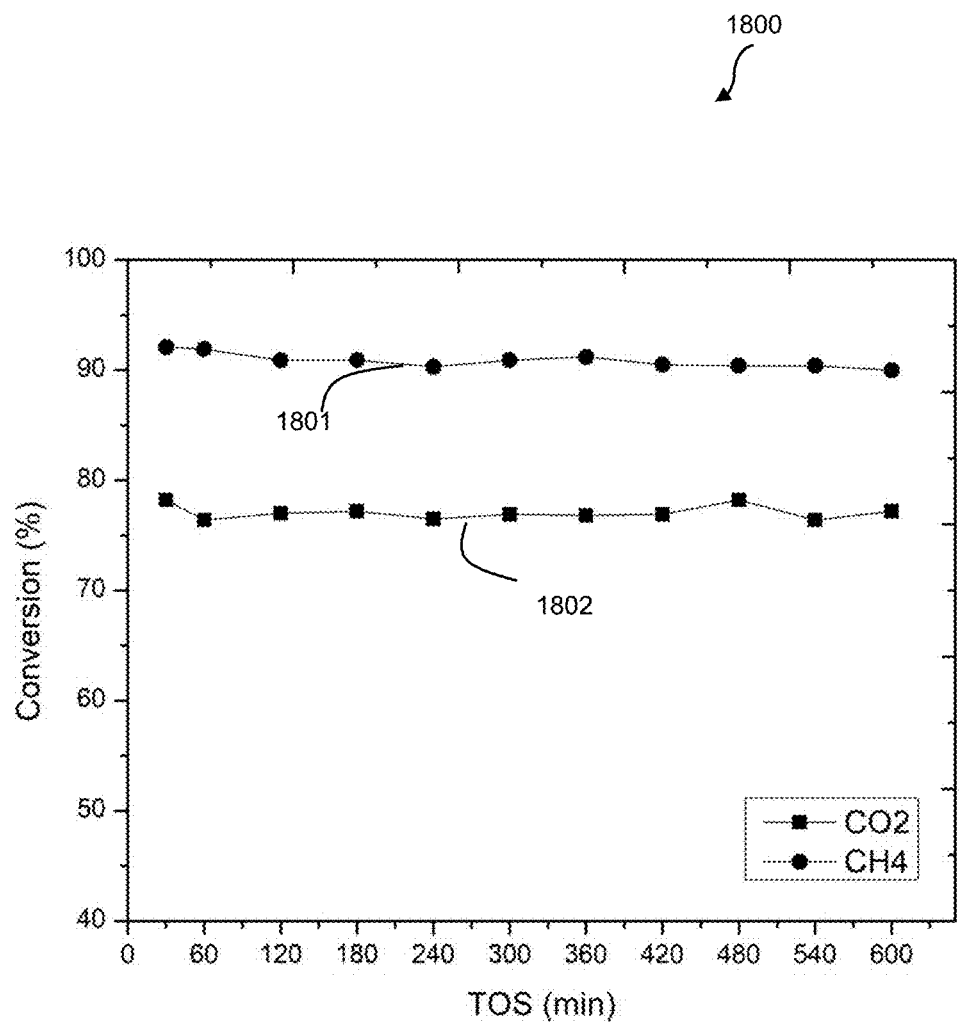
FIG. 18 is a graph representing the CH4 conversion rate (%) in 10 hours observation period vs reaction time (min) in accordance with an exemplary embodiment of the present invention.

Referring to FIG. 18, a graph 1800 showing the conversion rate of natural gas containing $CH_4$ and $CO_2$ over a time period of 10 hours is illustrated. The catalysts were also included for its activity stability for 10 hours (600 minutes) and thermal stability at 800° C. A curve 1801 of $CH_4$ shows a conversion rate above 90% and a curve 1802 of $CO_2$ shows a conversion rate a little below 80%. These curves 1801 and 1802 show that the catalyst exhibits good activity stability during the investigation period and the conditions of the reforming reaction.

The invention has been described through specific embodiments illustrating the invention. It should be noted that the layout, dimensions and/or similar materials can be varied in order to realize the invention at the desired scale.

Effect of the Invention

The present invention provides the integration of cold plasma technology into a catalytic reforming process to convert a $CO_2$-rich gas mixture consisting of natural gas and biogas into a synthesis gas consisting of $H_2$ and CO for the purpose of lowering the reaction temperature, thereby reducing energy costs. Specifically, the present invention provides a process for reforming a $CO_2$-rich gas mixture to generate syngas by cold plasma integration technology before performing the reforming reaction using a cold plasma device with electrical barrier configuration lip.

The present invention also allows the design, construction and stable operation of a cold plasma system and the application of this cold plasma technology in a reforming process that converts a mixture of $CO_2$ rich gases including natural gas and biogas. into syngas including $H_2$ and CO with high efficiency, while helping to reduce the reaction temperature, thereby reducing energy costs and increasing the durability (working time) of the catalyst, Specifically, the present invention provides a procedure for performing a reforming reaction incorporating cold plasma to pre-treat the raw materials to help reduce the reaction temperature (30 to 40° C.) or in other words to reduce energy consumption (saving up to 23%) cost of electricity per hour of syngas production.

The use of plasma acts on the material flow with the desire to reduce the binding energy of the molecules and reduce the reaction energy. Thereby, reducing the energy required for the reaction and reducing costs for investors. For application to the reforming reaction with $CH_4$ and $CO_2$ feedstocks, the plasma application is oriented to produce an intermediate mixture with higher enthalpy than the initial mixture. This orientation can be accomplished through (1) customizing the plasma generator quantities or (2) applying plasma to the material objects so that favorable intermediate compounds can be added for the reforming reaction. In addition, the device of the present invention is designed in the form of a micro-reactor to evaluate the efficiency of catalysts, materials and elements in the reaction process. Small inner diameter to ensure uniform mass transfer and heat transfer throughout the catalyst layer.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

REFERENCES

1. L. Appels, J. B., J. Degreve, R. Dewilj, *Progressin Energy and Combustion Science* 2008.34: p. 755-781.
2. Srivastava, S. K., Waste Disposal & Sustainable Energy, 22. 2: p. 85-103.
3. Rostrup-Nielsen, J. R., *Syngas in perspective*. Catalysis Today, 2002. 71: p. 243 247.
4. https://www.pvpower. vn/nang-luong-sinh-khoi-o-vietnam-van-chi-la-tiem-nang
5. https://baotainguyenmoitruong. vn/huong-di-moi-quanly-toan-dien-chat-thai-chan-nuoi-298684.html
6. Nguyen, H. H., Heaven, S., & Banks, C. *Energy potential from the anaerobic digestion of food waste in municipal solid waste stream of urban areas in Vietnam*. International Journal of Energy and Environmental Engineering, 2014. 5(4): p. 365-374.
7. Han, S., Shin, H., *Biohydrogen production by anaerobic fer—mentation of food waste*. Int. J. Hydr. Ener., 2004. 29(6): p. 569-577.
8. Kwon, S., Lee, D, *Evaluation of Korean food waste composting with fed-batch operations I: using water extractable total organic carbon contents (TOCw)*. Process Biochem, 2004. 39(10): p. 1183-1194
9. Shin, H., Youn, J., Kim, S., *Hydrogen production from food waste in anaerobic mesophilic and thermophilic acidogenesis*. Int. J. Hydrog. Energy, 2004. 29(13): p. 1355-1363.
10. Rao, M. S., Singh, S. P, *Bioenergy conversion studies of organic fraction of MSW: kinetic studies and gas yield—organic loading relationships for process optimisation*. Bioresour. Technol., 2004. 95(2): p. 173-185.
11. Zhang, L., Lee, Y.-W., Jahng, D., *Anaerobic co-digestion of food waste and piggery wastewater: focusing on the role of trace elements*. Bioresour. Technol., 2011. 102(8): p. 5048-5059.
12. Zhang, R., El-Mashad, H. M., Hartman, K., Wang, F., Liu, G., Choate, C., Gamble, P, *Characterization of food waste as feedstock for anaerobic digestion*. Bioresour. Technol, 2007. 98(4).
13. Mott-Smith, H. M., History of "Plasmas". Nature, 1971. 233(5316): p. 219-219.
14. Liu, C.-j., G. P. Vissokov, and B. W. L. Jang, *Catalyst preparation using plasma technologies*. Catalysis Today, 2002. 72(3): p. 173-184.
15. Wang, Z. L., Chang-Jun, *Preparation and application of iron oxide/graphene based composites for electrochemical energy storage and energy conversion devices: Current status and perspective*. Nano Energy, 2015. 11: p. 277-293.
16. R. Snoeckx, S. H., *CO2 conversion in a dielectric barrier discharge plasma: $N_2$ in the mix as helping hand or problematic impurity*. The Royal Society of Chemistry, 2013. 1: p. 1-16.
17. Zunrong Sheng, S. K., Kenta Sakata and Tomohiro Nozaki, *Plasma-Enabled Dry Methane Reforming*. Plasma Chemistry and Gas Conversion, 2018.
18. Kogelschatz, U., *Their History, Discharge Physics, and Industrial Applications. Plasma Chemistry and Plasma Processing.*, 2003. 23: p. 1-46.
19. Annemie Bogaerts, E. N., Renaat Gijbels, Joost van der Mullen, *Gas discharge plasmas and their applications*. Spectrochimica Acta Part B: Atomic Spectroscopy, 2002. 57(4): p. 609-658.
20. Shijie Li, X. D., Xin Yu, Ghulam Abbas, Qian Zhang, Li Cao, *The application of dielectric barrier discharge non-thermal plasma in VOCs abatement: A review. Chemical Engineering Journal.*, 2020. 388: p. 124-275.
21. Robby Aerts, W. S. a. A. B., *Carbon Dioxide Splitting in a Dielectric Barrier DischargePlasma: A Combined Experimental and Computational Study. ChemSusChe*, 2015. 8(4): p. 702-716.
22. Robby Aerts, T. M., and Annemie Bogaerts, *Influence of Vibrational States on CO2 Splitting by Dielectric Barrier Discharges*. The Journal of Physical Chemistry C, 2012. 116(44): p. 23257-23273.
23. Stijn Heijkers, M. A., and Annemie Bogaerts, *Plasma-Based CH4 Conversion into Higher Hydrocarbons and $H_2$: Modeling to Reveal the Reaction Mechanisms of Different Plasma Sources*. The Journal of Physical Chemistry C, 2020. 124(13): p. 7016-7030.
24. Gardeniers, M. T. a. H., *Plasma Catalytic Conversion of CH4 to Alkanes, Olefins and $H_2$ in a Packed Bed DBD Reactor*. Processes, 2020. 8(774).

25. Christophe De Bie, B. V., Tom Martens, Jan van Dijk, Sabine Paulussen, Annemie Bogaerts, *Fluid Modeling of the Conversion of Methane into Higher Hydrocarbons in an Atmospheric Pressure Dielectric Barrier Discharge*. Plasma Processes Polym, 2011. 8: p. 1033-1058.
26. Christophe De Bie, J. v. D., and Annemie Bogaerts, *The Dominant Pathways for the Conversion of Methane into Oxygenates and Syngas in an Atmospheric Pressure Dielectric Barrier Discharge*. J. Phys. Chem. C, 2015. 119(39): p. 22331-22350.
27. Bogaerts, A. a. D. B., Christophe and Snoeckx, Ramses and Kozák, Tomas. *Plasma based $_{CO2}$ and CH4 conversion: A modeling perspective*. Plasma Processes and Polymers, 2017. 14(6).
28. Ramses Snoeckx, R. A., Xin Tu, and Annemie Bogaerts, *Plasma-Based Dry Reforming: A Computational Study Ranging from the Nanoseconds to Seconds Time Scale*. The Journal of Physical Chemistry C, 2013. 117(10): p. 4957-4970.
29. Chao Xu, X. T., *Plasma-assisted methane conversion in an atmospheric pressure dielectric barrier discharge reactor*. Journal of Energy Chemistry, 2013. 22(3): p. 420-425.
30. Asif Hussain Khoja, M. T., Nor Aishah Saidina Amin, *Dry reforming of methane using different dielectric materials and DBD plasma reactor configurations*. Energy Conversion and Management, 2017. 144: p. 262-274.
31. Sabine Paulussen, B. V., Xin Tu, Christophe De Bie, *Conversion of carbon dioxide to value-added chemicals in atmospheric pressure dielectric barrier discharges*. Plasma Sources Science and Technology, 2010. 19(3): p. 34015.
32. Xingyuan Gao, Z. L., Tingting Li, *Recent Developments in Dielectric Barrier Discharge Plasma-Assisted Catalytic Dry Reforming of Methane over Ni-Based Catalysts*. Catalysts, 2011(11): p. 0.455.
33. A Ozkan, A. B. a. F. R., *Routes to increase the conversion and the energy efficiency in the splitting of $CO_2$ by a dielectric barrier discharge*. Journal of Physics D: Applied Physics, 2017. 50: p. 84004.
34. Asif Hussain Khoj, M. T., Nor Aishah Saidina Amin, *Recent developments in non-thermal catalytic DBD plasma reactor for dry reforming of methane*. Energy Conversion and Management, 2019. 183: p. 529-560.
35. R. Snoeckx, S. H., K. Van Wesenbeeck, S. Lenaerts and A. Bogaerts, *$CO_2$ conversion in a dielectric barrier discharge plasma: $N_2$ in the mix as a helping hand or problematic impurity*. Energy Environ. Sci, 2016. 9: p. 999-1011.
36. Abhijit Majumdar, J. F. B., Rainer Hippler, Konstantin Matyash, and Ralf Schneider, *Chemical Reaction Studies in CH4/Ar and CH4/$N_2$ Gas Mixtures of a Dielectric Barrier Discharge*. The Journal of Physical Chemistry A., 2005. 109(41): p. 9371-9377.
37. Indarto, A. a. C., Jae-Wook and Lee, Hwaung and Song, Hyung, *Effect of additive gases on methane conversion using gliding ac discharge*. Energy., 2006. 31: p. 2986-2995.
38. Tran Ngoc Dam, N. H., T. Sasaki and T. Kikuchi, *Effect of Dielectric in a Plasma Annealing System at Atmospheric Pressure*. 2012.
39. Srivastava, A. K., *Selection of dielectric material for producing diffuse dielectric barrier discharge plasma at atmospheric pressure*. Materials today proceedings, 2019. 18(3): p. 1033-1038.
40. Y. Uytdenhouwen, S. V. A., I. Michielsen, V. Meynen, P. Cool, A. Bogaert, *A packed-bed DBD micro plasma reactor for $CO_2$ dissociation: Does size matter*. Chemical Engineering Journal., 2018.

DESCRIPTION OF NUMERALS

100 catalytic gas reforming system with cold plasma
110 $CO_2$-rich natural gas inputs stage
120 DBD cold plasma stage
130 catalytic reforming reaction stage
140 final product separation and storage stage
150 energy saving sub-system
200 gas reforming system
210 natural gas input stage
211 $N_2$ gas source
212 $H_2$ gas source
213 $CO_2$ gas source
214 $CH_4$ gas source
215 tri-directional valves
216 pressure gauges
217 uni-directional valves
218 bubble flowmeter
219 mass flow controller (MFC)
220 dielectric barrier discharge (DBD) cold plasma stage
221 DBD cold plasma reactor
222 energy saving sub-system
222-1 water source
222-2 water pump
222-3 bi-directional valve
222-4 high temperature steam feedback line
222-5 water tank (with heater)
225 bi-directional water valve
225-2 three-way water valve
230 catalytic reforming reaction stage
231 catalytic reforming reaction unit
232-I infeed
232-O outlet
232-S infeed sample connector
233 pressure gauze
234 temperature sensor
235 pressure gauze
236 heaters
237 insulator
238 endothermic steam chamber
239 catalytic reactor core
239-1 catalytic layer
240 product separation stage
241 infeed tube
242 condenser unit
243 safety outlet
244 flow meter
245 vent
246 zeolite column unit
247 flash drum unit
300 dielectric barrier discharge cold plasma unit
301 base
302 vertical support column
303 vertical support column
304 vertical support column
305 input side supporting ring
306 output side supporting ring
307 top protecting lid
310 heat dissipating unit
311 heat sink plate
312 fan
313 power supply unit 320 cold plasma reactor
321 gas inlet connector
322 gas outlet connector
400 cold plasma reactor
401 input terminal
402 output terminal
403 inner electrode
404 mesh outer electrode
405 dielectric layer
406 discharge gap
411 high voltage power supply source
500 dielectric layer
501 outer surface
502 inner surface
503 inner hollow space (discharge gap)
600 single-chamber catalytic reforming reaction system
601 steam input feed
602 gas input feed
610 single-chamber catalytic reforming reactor unit
611 pressure gauze
612 heat sensor
613 insulator section
614 heaters
615 water steam chamber
616 reforming reactor core
617 catalyst layer
618 output terminal
621 steam input feedback
622 bi-directional valve
623 first steam feedback
624 second steam feedback
700 multiple-chamber catalytic reforming reaction system
701 container
702 first multiple inlets
703 second multiple inlets
704 first multiple outlets
705 second multiple outlets
706 water storage
707 bi-directional valve
707-1 direct steam input
707-2 combined steam input
709 switch valve
711 endothermic reactors
712 catalytic materials
713 exothermic reactors

What is claimed is:

1. A process for reforming natural gas into syngas, comprising:
 a) transforming said natural gas into a cold plasma state using a dielectric barrier discharge (DBD) cold plasma unit positioned before and separate from a catalytic reforming reactor;
 b) using a convection current between an output of said DBD cold plasma unit and a steam chamber of said catalytic reforming reactor to input said cold plasma state of said natural gas into an input of said catalytic reforming reactor; and
 c) reforming said natural gas in said plasma state using said catalytic reforming reactor equipped with a Ni-based reforming catalyst in form of a monolith structure having a predetermined length L; wherein said Ni-based reforming catalyst is prepared using nickel (Ni) in form of a powder having a 10 percentage weight (10% wt), magnesium (Mg) having 5 percentage weight (5% wt) both deposited on aluminum oxide ($Al_2O_3$); and wherein said Ni-based reforming catalyst is reduced by passing nitrogen gas at a rate of 50 to 100 mL/min through a reforming reactor until the temperature in said reforming reactor reaches 800° C. then passing hydrogen gas through said reforming reactor at a flow rate of 60 mL/min for one hour.

2. The process of claim 1 further comprising setting a power of said output of said DBD cold plasma unit from 15 W to 20 W, preferably at 20 W.

3. The process of claim 1 further comprising d) providing heat energy to said catalytic reforming reactor that includes (a) a heat exchange between endothermic reactions of reforming reactions between said natural gas and said Ni-based reforming catalyst and said exothermic reaction of a water steam in said steam chamber; and (b) latent heat of condensation of said water steam released into said input of said DBD cold plasma unit.

4. The process of claim 3 wherein said step (b) further comprises passing said cold plasma state of said natural gas through said catalytic reforming reactor at a rate of 50-120 mL/minute using a Plurality of mass flow controllers (MFC), a plurality of one-way valves, a plurality of bi-directional valves, a plurality of three-way valves.

5. The process of claim 1 further comprising:
 (d) placing said dielectric barrier discharge (DBD) cold plasma unit sufficiently close to said catalytic reforming unit so that coke deposition and recombination of said cold plasma state of said natural gas are prevented.

6. The process of claim 1, wherein said Ni-based reforming catalyst in form of powder has a general formula of $10Ni_2Co/Mg_{0.5}AlO_x$ wherein Ni has percentage weight of 10% wt, Cobalt (Co) of 2% wt, and Mg/Al ratio is 0.5 all deposited on a monolith frame having a 20 percentage weight (20% wt).

7. The process of claim 6 wherein said Ni-based reforming catalyst in powder form is synthesized by the following steps:
 a) preparing a solution of NaOH as a co-precipitating agent;
 (b) dissolving a mixture of nitrate salts in distilled water;
 (c) simultaneously adding and stirring at 360 rpm said nitrate salt solution and NaOH at 360 rpm to form $Na_2CO_3$;
 (d) adjusting the pH of the mixture of nitrate salts to between 8-12;
 e) stirring the resulting suspension and aging said mixture of nitrate salts;
 f) cooling said mixture of nitrate salts to room temperature, filtering and washing several times with distilled water to a neutral pH (~7) and drying it to produce a double structured hydroxide (hydrotalcite) $10Ni_2Co/Mg_{0.5}AlO_x$ catalyst;
 (g) heating the resultant $10Ni_2Co/Mg_{0.5}AlO_x$ catalyst in a calcination at 800° C. for six hours;
 (h) finely grinding said $10Ni_2Co/Mg0.5AlOx$ catalyst obtained after calcination to obtain a particle size between 2 and 5 μm and dispersing them into distilled water with a solid/liquid ratio of 30 g/L to produce a stable colloidal milk glue using ultrasound at pH of 8 and for a duration of one hour;
 (i) manufacturing a monolith frame into a cylinder with diameter φ being 12 mm and length L being 30 mm and said monolith frame is treated by sonicating said monolith frame in 90% methanol solution for 30 minutes at 60° C. and drying overnight at 110° C. to clean the surface of said monolith frame; and
 (j) immersing said monolith frame in the catalyst solution axially, fixing said monolith frame in the solution system at 30° C., for 5 minutes, blowing dry to remove any liquid from the surface of said monolith frame by hot air flow; and (k) drying said monolith frame at a temperature of 110° C. for 15 minutes and repeating this process of impregnation and drying 20 times with a dipping time of 1 minute until the active phase mass is about 20% of the mass of said monolith frame: (d) finally, treating said $10Ni_2Co/Mg0.5AlOx$ catalyst with heat at the temperature of 550° C. at a rate of 2° C./min for 3 hours to increase the catalytic activities.

8. The process of claim 6 wherein said Ni-based reforming catalyst is synthesized by co-precipitation of nitrate salts.

9. The process of claim 8 wherein said nitrate salts comprising $Ni(NO_3)_2 \cdot 6H_2O$, $Co(NO_3)_2 \cdot 6H_2O$, $Mg(NO_3)_2 \cdot 6H_2O$ and $Al(NO_3)_3 \cdot 9H_2O$.

10. A gas reforming system, comprising:
  d) a dielectric barrier discharge (DBD) cold plasma unit configured to receive and transform a natural gas into a cold plasma state;
  e) a catalytic reforming reactor operable to reform said cold plasma state of said natural gas into syngas using a Ni-based reforming catalyst in form of a monolith structure having a predetermined length L; and
  f) an energy management sub-system, coupled to said DBD cold plasma unit and said catalytic reforming reactor, operable to provide convection currents, a latent heat of condensation, and a heat exchange between endothermic reactions and exothermic reactions within said catalytic reforming reactor; wherein said Ni-based reforming catalyst further comprises nickel (Ni) in form of a powder having a 10 percentage weight (10% wt), magnesium (Mg) having 5 percentage weight (5% wt) both deposited on aluminum oxide ($Al_2O_3$); and wherein said Ni-based reforming catalyst is reduced by passing nitrogen gas at a rate of 50 to 100 mL/min through a reforming reactor until the temperature in said reforming reactor reaches 800° C. then passing hydrogen gas through said reforming reactor at a flow rate of 60 mL/min for one hour.

11. The system of claim 10 wherein said predetermined length L of said Ni-based reforming catalyst is 30 mm.

12. The system of claim 10 wherein said energy management sub-system further comprises: a water source at room temperature; a water pump; water tank in communication to a steam chamber of said catalytic reforming reactor.

13. The system of claim 12 further comprises a plurality of mass flow controllers (MFC), a plurality of one-way valves, a plurality of bi-directional valves, a plurality of three-way valves connected together so that said cold plasma state of said natural gas passes through said reforming reactor at a rate of 50-120 mL/minute.

14. The system of claim 10 wherein said DBD cold plasma unit further comprises:
  a reactor having a cylindrical structure;
  an inner electrode positioned at a center of said reactor;
  a dielectric layer covering an inner surface of said reactor;
  a mesh outer electrode covering an outer surface of said reactor; and
  a voltage supply source electrically connected to said inner electrode and said mesh outer electrode.

15. The system of claim 14, wherein said dielectric layer is made of Pyrex which has a length of 15 mm, a thickness of 2 mm and a diameter of 12 mm.

16. The system of claim 15 wherein said voltage power supply is a 60 Hz AC source capable of outputting 1-10 kV.

17. The system of claim 16 wherein said catalytic reforming reactor further comprises:
  a container having an input terminal operative to receive an input mixture of said natural gas and a water steam at 110° C.;
  an insulator chamber equipped with electrical heaters;
  said steam chamber concentric and directly adjacent to receive thermal energy from said insulator chamber; and
  a reactor core concentric and directly adjacent to carry out said heat exchange between said endothermic reactions of said input mixture and said Ni-based reforming catalyst and said exothermic reactions of said water steam in said steam chamber.

18. The system of claim 17 wherein said steam chamber further comprises a feedback tube in fluid communication with said energy management sub-system.

19. The system of claim 18 wherein said catalytic reforming reactor further comprises:
  a container having an input terminal operative to receive an input mixture of said natural gas and a water steam at 110° C.;
  an insulator chamber equipped with electrical heaters;
  said steam chamber concentric and adjacent to receive thermal energy from said insulator chamber; and
  a plurality of reactor cores placed inside said steam chamber to carry out said heat exchange between said endothermic reactions of said input mixture and said Ni-based reforming catalyst and said exothermic reactions of said water steam in said steam chamber.

* * * * *